(12) United States Patent
Liang

(10) Patent No.: US 7,953,032 B2
(45) Date of Patent: May 31, 2011

(54) METHOD, SYSTEM AND APPARATUS FOR A DUAL MODE MOBILE DEVICE

(75) Inventor: Jie Liang, Plano, TX (US)

(73) Assignee: VeriSilicon, Inc., Plano, TX (US)

( * ) Notice: Subject to any disclaimer, the term of this patent is extended or adjusted under 35 U.S.C. 154(b) by 706 days.

(21) Appl. No.: 11/868,495

(22) Filed: Oct. 6, 2007

(65) Prior Publication Data

US 2008/0176548 A1      Jul. 24, 2008

Related U.S. Application Data

(60) Provisional application No. 60/849,974, filed on Oct. 6, 2006, provisional application No. 60/849,983, filed on Oct. 6, 2006, provisional application No. 60/851,202, filed on Oct. 12, 2006.

(51) Int. Cl.
   *H04L 12/66* (2006.01)
(52) U.S. Cl. ............. 370/311; 370/352; 455/552.1
(58) Field of Classification Search .......... None
   See application file for complete search history.

(56) References Cited

U.S. PATENT DOCUMENTS

| | | | |
|---|---|---|---|
| 6,636,504 | B1 | 10/2003 | Albers et al. |
| 6,690,655 | B1 | 2/2004 | Miner et al. |
| 6,940,820 | B2 | 9/2005 | Fang |
| 2003/0215078 | A1 | 11/2003 | Brahm et al. |
| 2004/0068668 | A1 | 4/2004 | Lor et al. |
| 2005/0197156 | A1 * | 9/2005 | Fourquin et al. ......... 455/553.1 |
| 2006/0045056 | A1 * | 3/2006 | O'Hara, Jr. ............... 370/338 |
| 2006/0268928 | A1 * | 11/2006 | Barzegar et al. .......... 370/465 |
| 2007/0094525 | A1 * | 4/2007 | Uguen et al. ............. 713/300 |
| 2007/0153986 | A1 * | 7/2007 | Bloebaum et al. ........ 379/45 |
| 2007/0173283 | A1 * | 7/2007 | Livet et al. ............. 455/552.1 |
| 2007/0249323 | A1 * | 10/2007 | Lee et al. ............... 455/411 |
| 2008/0222294 | A1 * | 9/2008 | Liang .................... 709/227 |
| 2010/0105379 | A1 * | 4/2010 | Bonner et al. ........... 455/433 |

OTHER PUBLICATIONS

International Search Report and Written Opinion for PCT/US2007/021472 dated Apr. 14, 2008.

* cited by examiner

*Primary Examiner* — Min Jung
(74) *Attorney, Agent, or Firm* — Daniel J. Chalker; Chalker Flores, LLP

(57) ABSTRACT

The present invention provides a dual mode mobile device that can use both cellular-based and IP-based applications with single application program interface and without having separate and distinct subsystems for each communications mode. The device may also include a power management module that considerably reduces the power consumption of the device by periodically entering a deep sleep mode for a predetermined sleep interval, changing power modes based on the status of one or more applications, automatically changing power modes based on incoming packets or a combination thereof. The device may also include a remote management module to diagnose, troubleshoot and solve problems involving one of the networks by using the device's ability to communicate using the other network. The dual mode capability of the mobile device allows a remote management server or operator to analyze, document and solve problems with the mobile device and/or its connections to a network.

39 Claims, 15 Drawing Sheets

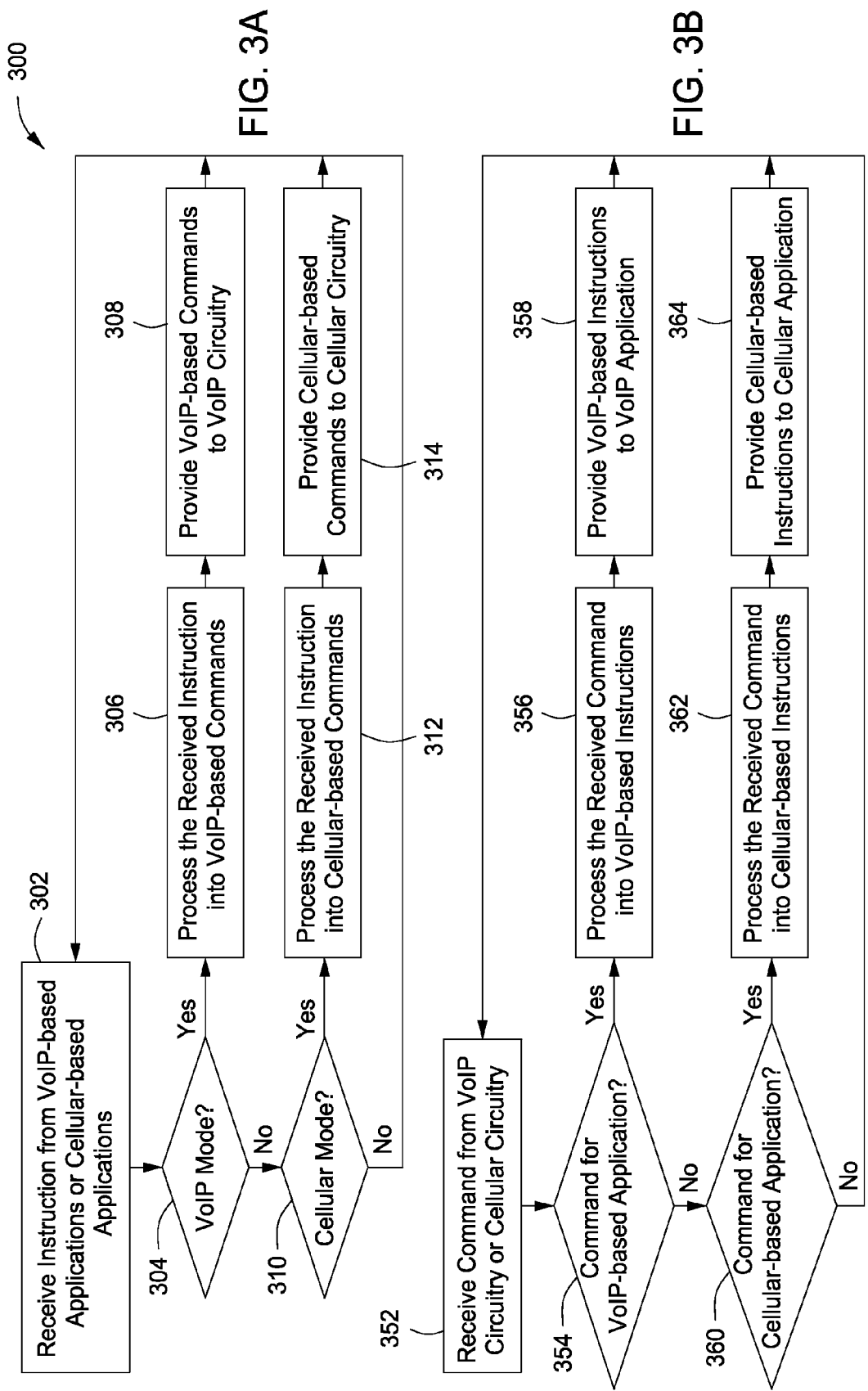

METHOD, SYSTEM AND APPARATUS FOR A DUAL MODE MOBILE DEVICE

PRIORITY CLAIM AND CROSS-REFERENCE TO RELATED APPLICATIONS

This patent application is a non-provisional application of the following U.S. provisional patent applications which are hereby incorporated by reference in their entirety: (1) application Ser. No. 60/851,202 filed on Oct. 12, 2006 and entitled "Method and Apparatus for a Dual Mode Mobile Device; (2) application Ser. No. 60/849,983 filed on Oct. 6, 2006 and entitled "Method and Apparatus for Power Management in a Dual Mode Mobile Device"; and (3) application Ser. No. 60/849,974 filed on Oct. 6, 2006 and entitled "Method, Apparatus and System for Remote Management of a Dual Mode Mobile Device."

FIELD OF THE INVENTION

The present invention relates generally to the field of mobile communications and, more particularly, to a method, system and apparatus for a dual mode mobile device.

BACKGROUND OF THE INVENTION

Some mobile phones are capable of operating under multiple communications standards, such as digital and analog, multiple digital standards (e.g., CDMA and GSM), etc. Communication standards have also been developed to theoretically allow cellular phones to communicate with a traditional cellular network as well as an Unlicensed Mobile Access Network. Dual mode devices or handsets capable of communicating with these two dissimilar networks are inefficient and cumbersome because each mode requires its own communications interfaces and applications.

For example, FIG. 1 shows a block diagram of the hardware/software elements of a cellular/UMA dual mode device 100 in accordance with the prior art. The cellular/UMA dual mode device 100 uses two distinct communications subsystems (Voice Over Internet Protocol (VoIP) 102 and Cellular Radio Frequency (RF) (e.g., GSM) 104) operated by a common operating system 106 to communicate with the two different communications networks (e.g., UMA and GSM). The handset 100 UMA subsystem 102 includes a wireless local area network (WLAN) transceiver 108, a network adapter 110, a VoIP protocol stack 112, a VoIP communications interface 114 and Internet Protocol (IP) based applications 116 (e.g., Phone Book 118, VoIP Client 120, Internet Browser 122, E-mail 124, etc.). The handset 100 Cellular subsystem 104 includes a RF transceiver 126, a baseband processor 128, a cellular protocol stack 130, a cellular interface 132 and cellular-based applications 134 (e.g., Phone Book 136, SMS 138, MMS 140, E-mail 142, etc.).

The two distinct subsystems are a result of the fact that wireless computer network communications have been developed separately and in parallel with cellular communications. As a result, IP-based applications 116 and cellular-based applications 134 have been developed independently of one another and are not capable of working across platforms without significant customization and modification. In other words, an "off-the-shelf" IP-based Phone Book application 118 cannot interface with the cellular interface 132. Likewise, and "off-the-shelf" cellular based Phone Book application 136 cannot interface with the VoIP communications interface 114. As shown in FIG. 1, the current solution to this problem is to have a separate and distinct subsystem with its own applications for each communications mode.

Another problem is that a traditional battery for a cellular/UMA dual mode device may only last for less than 24 hours under normal use before it must be recharged. For example, a typical GSM phone will operate in three power modes: active (connected to network during an active session); sleep (connected to the network in standby mode); and deep sleep (not connected to the network). Typical power consumption for these three power modes can be: 150 mA in active mode; 1 mA in sleep mode; and 0.2 mA in deep sleep mode. As will be appreciated by those skilled in the art, power consumption of a dual mode phone can easily be twice that of a single mode phone. As a result, the battery life and corresponding talk times and standby times are cut in half. Consumers have grown accustomed to the current talk and standby times of single mode phones, so the shortened talk and standby times of a dual mode phone are undesirable.

In addition, although establishing communication connections and sessions within a cellular network are virtually seamless to the end user, establishing communication connections and sessions to an UMAN are currently far from seamless. If a user has difficulty connecting to the UMAN, the user must figure out the problem on his/her own or consult the operator of the UMAN. As a result, the user will likely become frustrated and dissatisfied with the dual mode communications device. Accordingly, the user may not continue to use the dual mode device or may influence others not to use dual mode devices because of his/her bad experience.

There is, therefore, a need for a method and apparatus for a dual mode mobile device that can use both cellular-based and IP-based applications without having separate and distinct subsystems for each communications mode.

SUMMARY OF THE INVENTION

The present invention provides a system, method and apparatus for a dual mode mobile device that can use both cellular-based and IP-based applications without having separate and distinct subsystems for each communications mode. A single application program interface allows new IP-based applications or cellular-based applications to be added to the communications device without customizations or modifications. As a result, the new IP-based applications or cellular-based applications can be off-the-shelf applications. Moreover, software updates, upgrades and fixes can be provided more easily to the end user. Similarly, the user can add new software to the device easily (plug-and-play).

In addition, one embodiment of the present invention also provides a power management module that considerably reduces the power consumption of a dual mode mobile device by periodically entering a deep sleep mode for a predetermined sleep interval, changing power modes based on the status of one or more applications, automatically changing power modes based on incoming packets or a combination thereof. This power management module can be applied to the UMA mode, the cellular mode or both modes collectively or separately. As a result, the present invention extends the battery life of the dual mode phone without having to use larger, heavier and more expensive batteries.

Moreover, another embodiment of the present invention also provides remote management of a dual mode mobile device to diagnose, troubleshoot and solve problems involving one of the networks by using the device's ability to communicate using the other network. The dual mode capability of the mobile device allows a remote management server or operator to analyze, document and solve problems with the mobile device and/or its connections to a network. Although the problems will most likely be associated with the UMAN, the present invention can also be used to solve problems associated with the cellular network and/or the mobile device itself. As a result, the present invention provides a valuable service and helps to ensure the success of dual mode mobile devices.

More specifically, the present invention provides a method of using one or more VoIP-based applications and one or more cellular-based applications in a communications device having VoIP module and cellular module. An instruction is received from the VoIP-based applications or the cellular-based applications at a single application program interface communicably coupled to the VoIP-based applications, the cellular-based applications, the VoIP module and the cellular module. The instruction is processed into one or more VoIP-based commands and provided to the VoIP module whenever the communications device is operating in a VoIP mode. The instruction is processed into one or more cellular-based commands and provided to the cellular module whenever the communications device is operating in a cellular mode. A command is received from the VoIP module or the cellular module at the single application program interface and it is determined whether the command is to be provided to one of the VoIP-based applications or one of the cellular-based applications. The command is processed into one or more VoIP-based instructions and provided to the VoIP-based application whenever the command is to be provided to the VoIP-based application. The command is processed into one or more cellular-based instructions and provided to the cellular-based application whenever the command is to be provided to the cellular-based application. Note that the method can be implemented using a computer program embodied on a computer readable medium wherein each step is preformed by one or more code segments.

Another embodiment of the present invention provides a dual mode communications device having one or more VoIP-based applications, a VoIP module, one or more cellular-based applications, a cellular module and a single application program interface communicably coupled to the VoIP-based applications, the VoIP module, the cellular-based applications and the cellular module. The single application program interface receives an instruction from the VoIP-based applications or the cellular-based applications, processes the instruction into one or more VoIP-based commands and provides the VoIP-based commands to the VoIP module whenever the communications device is operating in a VoIP mode, processes the instruction into one or more cellular-based commands and provides the cellular-based commands to the cellular module whenever the communications device is operating in a cellular mode. The single application program interface also receives a message from the VoIP module or the cellular module, determines whether the message is to be provided to one of the VoIP-based applications or one of the cellular-based applications, processes the message into one or more VoIP-based messages and provides the VoIP-based messages to the VoIP-based application whenever the message is to be provided to the VoIP-based application, and processes the instruction into one or more cellular-based messages and provides the cellular-based messages to the cellular-based application whenever the message is to be provided to the cellular-based application.

Yet another embodiment of the present invention provides a dual mode communications device having one or more VoIP-based applications, a VoIP module, one or more cellular-based applications, a cellular module, a power management module, and a single application program interface communicably coupled to the VoIP-based applications, the VoIP module, the cellular-based applications and the cellular module. The single application program interface receives an instruction from the VoIP-based applications or the cellular-based applications, processes the instruction into one or more VoIP-based commands and provides the VoIP-based commands to the VoIP module whenever the communications device is operating in a VoIP mode, processes the instruction into one or more cellular-based commands and provides the cellular-based commands to the cellular module whenever the communications device is operating in a cellular mode. The single application program interface also receives a message from the VoIP module or the cellular module, determines whether the message is to be provided to one of the VoIP-based applications or one of the cellular-based applications, processes the message into one or more VoIP-based messages and provides the VoIP-based messages to the VoIP-based application whenever the message is to be provided to the VoIP-based application, and processes the instruction into one or more cellular-based messages and provides the cellular-based messages to the cellular-based application whenever the message is to be provided to the cellular-based application. The power management module monitors a minimum required power mode for each application running on the dual mode communications device, determines whether the minimum required power mode permits a lower power mode and changes to the lower power mode for the VoIP module, the cellular module or both whenever the lower power mode is permitted by the minimum required power mode.

Another embodiment of the present invention provides a system having one or more communications devices communicably coupled to a remote manager via one or more networks. Each communications device includes a VoIP module, a cellular module and a diagnostic module communicably coupled to the VoIP module and the cellular module. The diagnostic module obtains data regarding the communications device, selects a communications protocol and either the VoIP module or the cellular module, creates a first message containing the data using the selected communications protocol, sends the first message to the remote manager via the selected module, receives a second message containing one or more configuration parameters from the remote manager via the selected module, and implements the configuration parameters. The remote manager receives the first message containing data obtained from the communications device, analyzes the data from the first message, creates the configuration parameters, creates the second message containing the configuration parameters and sends the second message to the communications device.

The present invention is described in detail below with reference to the accompanying drawings.

BRIEF DESCRIPTION OF THE DRAWINGS

The above and further advantages of the invention may be better understood by referring to the following description in conjunction with the accompanying drawings, in which:

FIGS. 3A and 3B are flow charts of methods of operating a cellular/UMA dual mode device in accordance with the present invention;

DETAILED DESCRIPTION OF THE INVENTION

Figure 1:
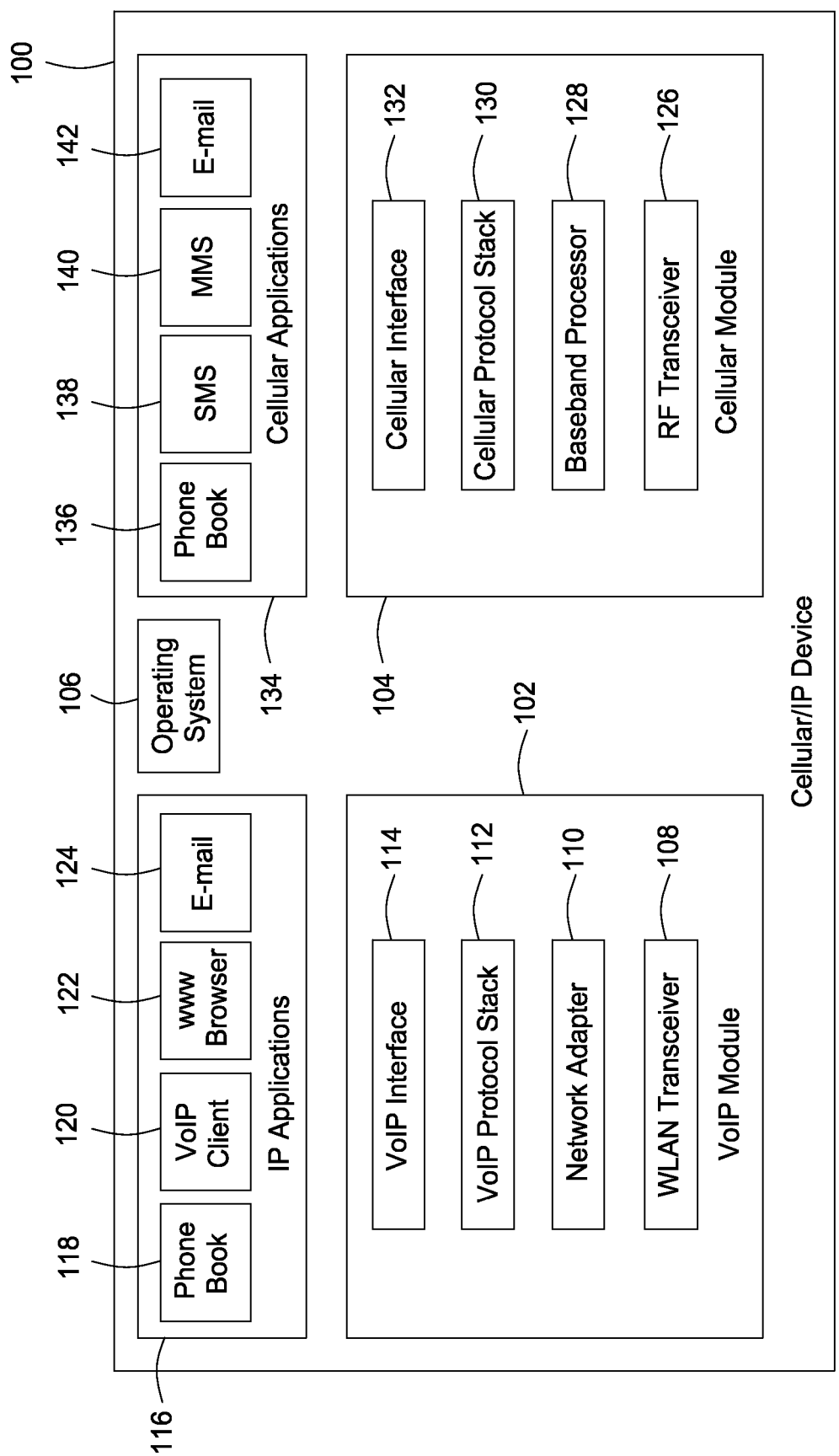
FIG. 1 is a block diagram of the hardware/software elements of a cellular/UMA dual mode device in accordance with the prior art.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

As used herein, the term instruction refers to one or more commands, instructions, messages or other information with or without data that are received from any type of application running in a dual mode communications device. The term command refers to one or more commands, instructions, messages or other information with or without data that are received from a cellular module or VoIP module within a dual mode communications device. The term message refers to any digital signal, analog signal, communications packet (signaling or data) or communications signal that is received by or transmitted by a dual mode communications device. As a result, these specific terms are used merely to clarify the source and/or destination of the commands, instructions and messages in reference to the present invention, and are not intended to limit the scope of the present invention. The term module refers to any circuit, component, hardware, software or combination thereof to perform a specified function. The module can be integrated into the device or a self-contained unit that can be added or removed from the device The present invention provides a method and apparatus for a dual mode mobile device that can use both cellular-based and IP-based applications without having separate and distinct subsystems for each communications mode. A single application program interface allows new IP-based applications or cellular-based applications to be added to the communications device without customizations or modifications. As a result, the new IP-based applications or cellular-based applications can be off-the-shelf applications. Moreover, software updates, upgrades and fixes can be provided more easily to the end user. Similarly, the user can add new software to the device easily (plug-and-play).

In addition, one embodiment of the present invention also provides a power management module that considerably reduces the power consumption of a dual mode mobile device by periodically entering a deep sleep mode for a predetermined sleep interval, changing power modes based on the status of one or more applications, automatically changing power modes based on incoming packets or a combination thereof. This power management module can be applied to the UMA mode, the cellular mode or both modes collectively or separately. As a result, the present invention extends the battery life of the dual mode phone without having to use larger, heavier and more expensive batteries.

Moreover, one embodiment of the present invention also provides remote management of a dual mode mobile device to diagnose, troubleshoot and solve problems involving one of the networks by using the device's ability to communicate using the other network. The dual mode capability of the mobile device allows a remote management server or operator to analyze, document and solve problems with the mobile device and/or its connections to a network. Although the problems will most likely be associated with the UMAN, the present invention can also be used to solve problems associated with the cellular network and/or the mobile device itself. As a result, the present invention provides a valuable service and helps to ensure the success of dual mode mobile devices.

Figure 2:
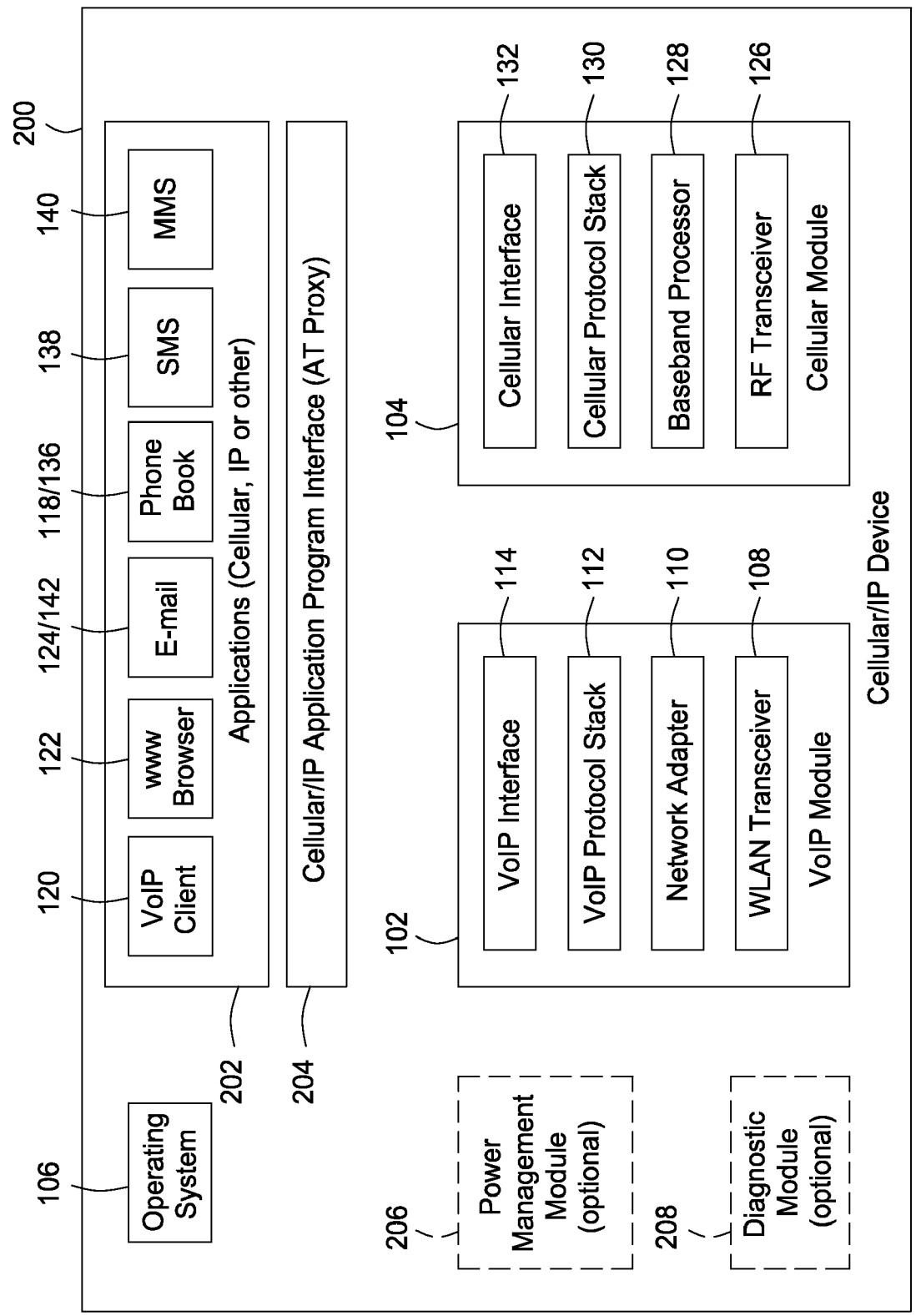
FIG. 2 is a block diagram of the hardware/software elements of a cellular/UMA dual mode device in accordance with the present invention.

Now referring to FIG. 2, a block diagram of the hardware/software elements of a cellular/UMA dual mode device 200 in accordance with the present invention are shown. The dual mode device 200 includes several applications 202, a single application program interface 204, an operating system 106, VoIP module 102 and cellular module 104. The dual mode device 200 may also include a power management module 206 and/or a diagnostic module 208. The single cellular/IP application program interface (AT Proxy) 204 is communicably coupled to the applications 202, VoIP module 102 and cellular module 104. The applications 202 include VoIP-based applications (e.g., VoIP Client 120, Internet Browser 122, E-mail 124, Phone Book 118 or any non-cellular-based application) and cellular-based applications (e.g., E-mail 142, Phone Book 136, SMS 138 and MMS 140). The VoIP module 102 includes a VoIP communications interface 114, a VoIP protocol stack 112, a network adapter 110 and a WLAN transceiver 108. Likewise, cellular module 104 includes a cellular interface 132, a cellular protocol stack 130, a baseband processor 128 and RF transceiver 126. The dual mode device can be a phone, handset, personal data assistant, computer, adapter, portable communications device, or a combination thereof.

As will be described in reference to FIG. 3A, the single application program interface 204 receives an instruction from the VoIP-based applications 120, 122, 124, 118 or the cellular-based applications 136, 138, 140, 142. The single application program interface 204 processes the received instruction into one or more VoIP-based commands and provides the VoIP-based commands to the VoIP module 102 whenever the communications device 200 is operating in a VoIP mode. The single application program interface 204 processes the received instruction into one or more cellular-based commands and provides the cellular-based commands to the cellular module 104 whenever the communications device 200 is operating in a cellular mode. For example, the single application program interface 204 can process or map all received instructions or commands (VoIP-based or cellular-based) into AT commands using a mapping table. The AT commands always start with AT (which means Attention) and finish with a <CR> character. Responses start and end with <CR><LF> (except for the ATV0 DCE response format) and the ATQ1 (result code suppression) commands. If the command syntax is incorrect, the "ERROR" string is returned. If the command syntax is correct, but transmitted with wrong parameters, the +CME ERROR: <Err> or +CMS ERROR: <SmsErr> strings are returned with adequate error codes if CMEE was previously set to 1. By default, CMEE is set to 0, and the error message is only "ERROR". If the command line has been executed successfully, an "OK" string is returned. In some cases, such as "AT+CPIN?" or (unsolicited) incoming events, the "OK" string is not returned as a response. The AT commands used by the single application program interface 204 may include, but are not limited to the commands shown in Table 1 below.

TABLE 1

AT Commands

| Type | Description | Command |
|---|---|---|
| General: | Manufacturer identification | +CGMI |
|  | Request model identification | +CGMM |
|  | Request revision identification | +CGMR |
|  | Product Serial Number | +CGSN |
|  | Request IMSI | +CIMI |
|  | Card Identification | +CCID |
|  | Power off | +CPOF |
|  | Set phone functionality | +CFUN |
|  | Phone activity status | +CPAS |
|  | Report Mobile Equipment errors | +CMEE |
|  | Keypad control | +CKPD |
|  | Clock Management | +CCLK |
|  | Alarm Management | +CALA |
|  | Select type of address | +CSTA |
|  | Call mode | +CMOD |
|  | Hangup call | +CHUP |
|  | S Command | S |
| Call Control: | Dial command | D |
|  | Hang-Up command | H |
|  | Answer a call | A |
|  | Remote disconnection |  |
|  | Extended error report | +CEER |
|  | DTMF signals | +VTD, +VTS |
|  | Redial last telephone number | ATDL |
|  | Automatic answer | ATS0 |
|  | Single Numbering Scheme | +CSNS |
|  | Gain control | +VGR, +VGT |
|  | Microphone Mute Control | +CMUT |
|  | Speaker & Microphone selection | +SPEAKER |
|  | Ring Melody Playback | +CRMP |
|  | Ringer Sound Level | +CRSL |
| Network service: | Signal Quality | +CSQ |
|  | Operator selection | +COPS |
|  | Network registration | +CREG |
|  | Preferred operator list | +CPOL |
|  | Read operator name | +COPN |
| Security: | Enter PIN | +CPIN |
|  | PIN remaining attempt number | +CPINC |
|  | Facility lock | +CLCK |
|  | Change password | +CPWD |
| Phonebook: | Select phonebook memory storage | +CPBS |
|  | Read phonebook entries | +CPBR |
|  | Find phonebook entries | +CPBF |

TABLE 1-continued

AT Commands

| Type | Description | Command |
|---|---|---|
|  | Write phonebook entry | +CPBW |
|  | Subscriber number | +CNUM |
|  | Set Voice Mail Number | +CSVM |
| Short Messages: | Select message service | +CSMS |
|  | New Message Acknowledgement | +CNMA |
|  | Preferred Message Storage | +CPMS |
|  | Preferred Message Format | +CMGF |
|  | Save Settings | +CSAS |
|  | Restore settings | +CRES |
|  | Show text mode parameters | +CSDH |
|  | New message indication | +CNMI |
|  | Read message | +CMGR |
|  | List message | +CMGL |
|  | Send message | +CMGS |
|  | Write Message to Memory | +CMGW |
|  | Send Message From Storage | +CMSS |
|  | Set Text Mode Parameters | +CSMP |
|  | Delete message | +CMGD |
|  | Service center address | +CSCA |
|  | Message status modification | +WMSC |
|  | Message overwriting | +WMGO |
|  | Unchange SMS Status | +WUSS |
| Supplementary Services: | Call forwarding | +CCFC |
|  | Call barring | +CLCK |
|  | Modify SS password | +CPWD |
|  | Call waiting | +CCWA |
|  | Calling line ID restriction | +CLIR |
|  | Calling line ID presentation | +CLIP |
|  | Call related supplementary services | +CHLD |
|  | List current calls | +CLCC |
|  | Supplementary service notifications | +CSSN |
|  | Unstructured supp. service data | +CUSD |
|  | Closed user group | +CCUG |
| Specific AT commands: | General Indications | +WIND |
|  | Mobile Equipment event reporting | +CMER |
|  | Abort command | +WAC |
|  | Hardware Version | +WHWV |
|  | Get the Start Cause | +TINIT |
|  | Set alert tone Command | +TMEL |
|  | Telephone minute alarm | +TMAS |
|  | Telephone firewall | +TFSW |
|  | Open Microphone power | +TCFG |
|  | Audio test Loop | +TLOOP |
|  | A3/A8 authentication | +TAUTH |
| SIM ToolKit | SIM ToolKit Set Facilities | +STSF |
|  | SIM ToolKit Indication | +STIN |
|  | SIM ToolKit Get Information | +STGI |
|  | SIM ToolKit Control Response | +STCR |
|  | SIM ToolKit Give Response | +STGR |
| GPRS | Define PDP Context | +CGDCONT |
|  | QoS Profile (Requested) | +CGQREQ |
|  | QoS Profile (Minimum acceptable) | +CGQMIN |
|  | GPRS attach or detach | +CGATT |
|  | PDP context activate or deactivate | +CGACT |
|  | Enter data state | +CGDATA |
|  | GPRS mobile station class | +CGCLASS |
|  | Select service for MO SMS msg | +CGSMS |
|  | GPRS event reporting | +CGEREP |
|  | GPRS network registration status | +CGREG |
|  | Request GPRS IP service | D* |
|  | Auto response to network request for PDP context activation | +CGAUTO |
|  | Manual response to network request for PDP context activation | +CGANS |
|  | Show PDP address | +CGPADDR |
|  | Cellular result codes | +CRC |
|  | Service reporting control | +CR |
|  | Extended error report | +CEER |
|  | GPRS parameters customization | +WGPRS |
|  | GPRS service quality | +CGQREQ |
|  | QoS Profile (Minimum acceptable) | +CGQMIN |

As will be described in reference to FIG. 3B, the single application program interface 204 receives a command from the VoIP module 102 or the cellular module 104, and determines whether the received command is to be provided to one of the VoIP-based applications 120, 122, 124, 118 or the cellular-based applications 136, 138, 140, 142. The single application program interface 204 processes the received command into one or more VoIP-based instructions and provides the VoIP-based instructions to the VoIP-based application 120, 122, 124, 118 whenever the command is to be provided to the VoIP-based application 120, 122, 124, 118. The single application program interface 204 processes the received command into one or more cellular-based instructions and provides the cellular-based instructions to the cellular-based application 136, 138, 140, 142 whenever the command is to be provided to the cellular-based application 136, 138, 140, 142.

The single application program interface 204 allows one or more new IP-based applications, cellular-based applications or other applications to be added to the communications device 200 without customizations or modifications. As a result, the new IP-based applications, cellular-based applications or other applications can be off-the-shelf applications. Moreover, software updates, upgrades and fixes can be provided more easily to the end user. Similarly, the user can add new software to the device easily (plug-and-play).

Referring now to FIGS. 3A and 3B, flow chart of methods 300 and 350 of operating a cellular/UMA dual mode device 200 in accordance with the present invention is shown. An instruction is received from the VoIP-based applications or the cellular-based applications at a single application program interface 204 in block 302. If the communications device 200 is operating in VoIP mode, as determined in decision block 304, the received instruction is processed into one or more VoIP-based commands in block 306. The VoIP-based commands are then provided to the VoIP module 102 in block 308 and the process awaits the next instruction in block 302. If, however, the communications device 200 is operating in cellular mode, as determined in decision block 304, the received instruction is processed into one or more cellular-based commands in block 312. The cellular-based commands are then provided to the cellular module 104 in block 314 and the process awaits the next instruction in block 302. Note that the method can be implemented using a computer program embodied on a computer readable medium wherein each step is preformed by one or more code segments.

A command is received from the VoIP module 102 or the cellular module 104 in block 352. If the received command is for a VoIP-based application, as determined in decision block 354, the received command is processed into one or more VoIP-based instructions in block 356. The VoIP-based instructions are then provided to the appropriate VoIP application in block 358 and the process awaits the next message in block 352. If, however, the received command is for a cellular-based application, as determined in decision block 354, the received command is processed into one or more cellular-based instructions in block 362. The cellular-based instructions are then provided to the appropriate cellular application in block 364 and the process awaits the next message in block 302. Note that the method can be implemented using a computer program embodied on a computer readable medium wherein each step is preformed by one or more code segments.

In addition, the methods described above may include adding one or more new IP-based applications or cellular-based applications to the communications device without customizations or modifications. As a result, the new IP-based applications or cellular-based applications can be off-the-shelf applications. Moreover, software updates, upgrades and fixes can be provided more easily to the end user. Similarly, the user can add new software to the device easily (plug-and-play).

Figure 4:
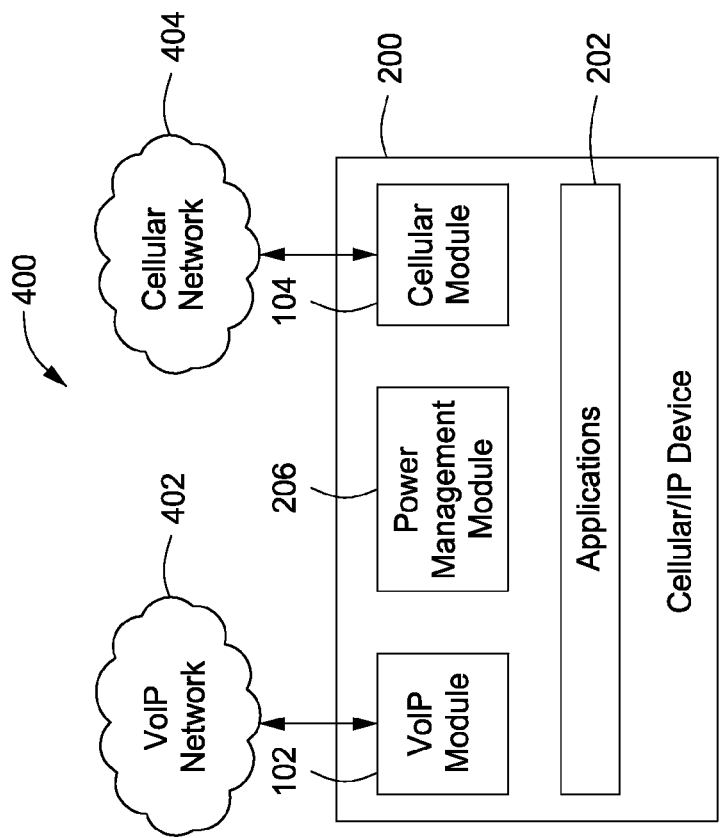
FIG. 4 is a simplified block diagram of a dual mode communications device having a power management module in accordance with one embodiment of the present invention.

Now referring to FIG. 4, a simplified block diagram 400 of a dual mode communications device 100 in accordance with one embodiment of the present invention is shown. The dual mode communications device 200 can communicate with a VoIP network 402 (e.g., unlicensed mobile access network) and/or a cellular network 404. The dual mode communications device 200 includes a VoIP module 102, a cellular module 104, a power management module 206 and one or more applications 202. The power management module 206 selectively puts the VoIP module 102 and/or the cellular module 104 in two or more power modes based on one or more criteria. The two or more power modes may include an active mode, a sleep mode, a deep sleep mode or other desirable operational modes. The one or more criteria can be various power consumption methods as described in reference to FIGS. 5-9 below. Note that all the methods discussed herein can be implemented using a computer program embodied on a computer readable medium wherein each step is preformed by one or more code segments.

For example, the power management module 206 can put the VoIP module 102 in a low power mode for a first time period whenever a VoIP network 402 is not accessible and then put the VoIP module 102 in a higher power mode upon expiration of the first time period. The first time period is increased whenever the VoIP network 402 is repeatedly not accessible. The power management module 206 can also put the cellular module 104 in a low power mode for a second time period whenever a cellular network 404 is not accessible and then put the cellular module 104 in a higher power mode upon expiration of the second time period. The second time period is increased whenever the cellular network 104 is repeatedly not accessible. The low power mode can be a deep sleep power mode or a sleep power mode. The higher power mode can be the sleep power mode or an active power mode. The first and second time periods can be the same or different. Moreover, the first and second time periods can be increased in accordance with a pattern, a preset increment, a dynamic increment or a combination thereof. The first and second time periods can also have a minimum value (e.g., ten seconds) and a maximum value (e.g., ten minutes).

Alternatively, the power management module 206 can monitor a minimum required power mode for each application 202 running on the dual mode communications device 200 and determine whether the minimum required power mode permits a lower power mode. If the lower power mode is permitted by the minimum required power mode, the power management module 206 changes the VoIP module 102, the cellular module 104 or both to the lower power mode. The lower power mode can be a deep sleep power mode or a sleep power mode.

In addition, the power management module 206 can determine whether a message received from a network 402 or 404 requires a higher power mode while the communications device 200 is operating in a low power mode. If the message does not require the higher power mode, the communications device 200 responds to the message without changing the power mode. If, however, the message requires the higher power mode, the power management module 206 changes the VoIP module 102, the cellular module 104 or both to the higher power mode. The low power mode can be a deep sleep power mode or a sleep power mode. The higher power mode can be the sleep power mode or an active power mode.

Figure 5:
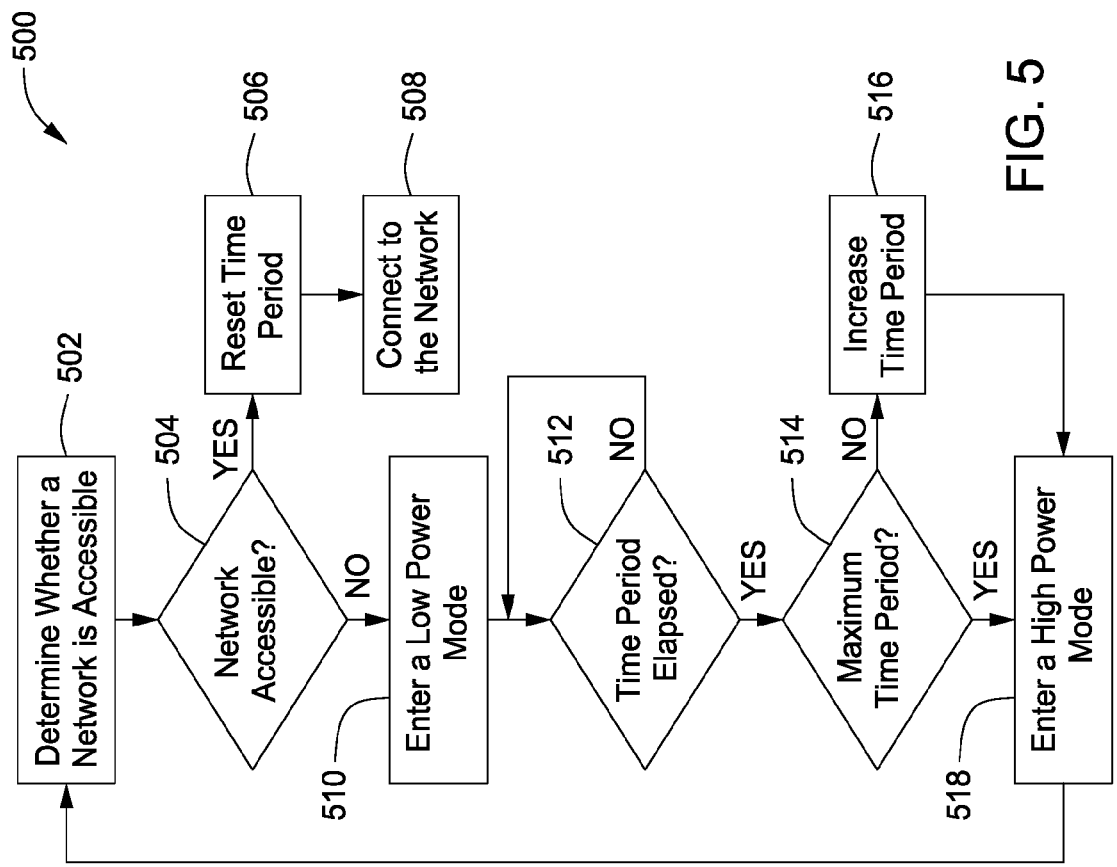
FIG. 5 is a flow chart of a power management process of a single or dual mode communications device in accordance with one embodiment of the present invention.

Referring now to FIG. 5, a flow chart of a power management process 500 of a communications device in accordance with one embodiment of the present invention is shown. The power management module determines whether a network is accessible in block 502. The network can be a VoIP network (e.g., an unlicensed mobile access network) and/or a cellular network. If the network is accessible, as determined in decision block 504, a time period is reset to a minimum time period (e.g., ten seconds) in block 506 and the communications device connects to the network in block 508. If, however, the network is not accessible, as determined in decision block 504, a low power mode (e.g., a deep sleep power mode, a sleep power mode, etc.) is entered in block 510. The device remains in the low power mode for a time period as shown by decision block 512. Once the time period elapses, as determined by decision block 512, and a maximum time period (e.g., ten minutes) has not be reached, as determined in decision block 514, the time period is increased in block 516. The time period can be increased in accordance with a pattern, a preset increment, a dynamic increment or a combination thereof. Thereafter, or if the maximum time period has been reached, as determined in decision block 514, the communications device enters a higher power mode (e.g., sleep power mode, active power mode, etc.) in block 518 and the process returns to block 502 where the network accessibility is determined again and the process repeats as previously described. Note that other minimum or maximum time periods can be used. The process 500 may also include determining whether any applications are incompatible with the low power mode prior to entering the low power mode, and entering the low power mode only when no applications are incompatible with the low power mode. Moreover, the process 500 may include receiving one or more communications from the network, and adjusting the power mode based on the received communications.

Figure 6:
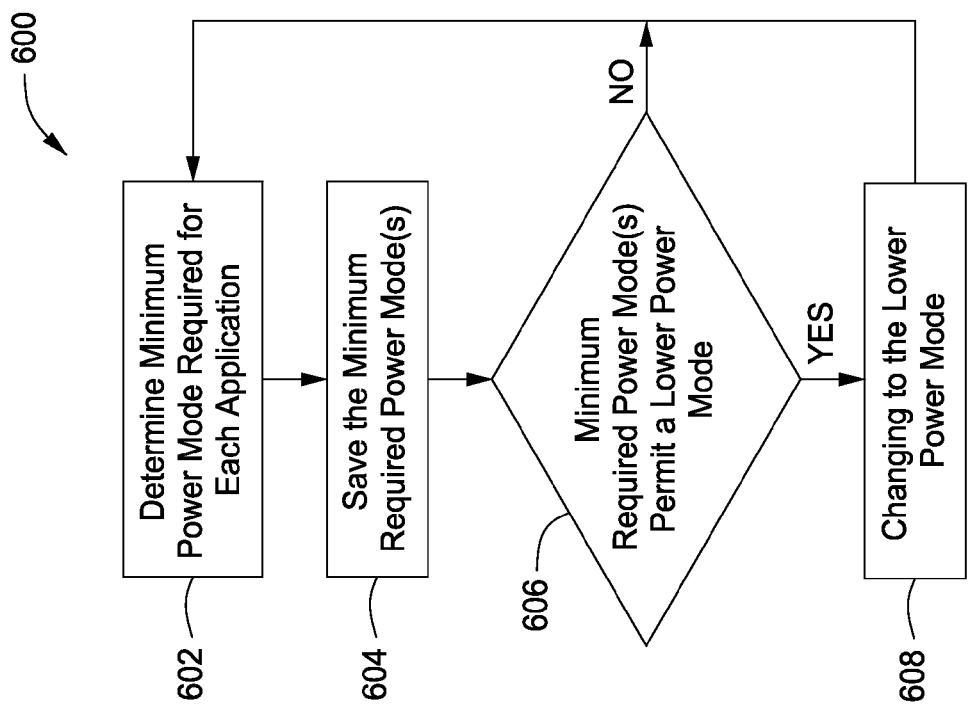
FIG. 6 is a flow chart of a power management process of a single or dual mode communications device in accordance with another embodiment of the present invention.

Now referring to FIG. 6, a flow chart of a power management process 600 of a single or dual mode communications device in accordance with another embodiment of the present invention is shown. The power management process 600 monitors a minimum required power mode for each application running on the communications device by determining the minimum required power mode for each application running on the communications device in block 602 and saving the minimum required power mode for each application in a memory of the communications device in block 604. The determination of whether a lower power mode is permitted can be performed periodically, or whenever there is a change in the minimum required power mode, or a combination thereof. If the minimum required power mode permits a lower power mode than the currently used power mode, as determined in decision block 606, the communications device changes to the lower power mode (e.g., deep sleep power mode, sleep power mode, etc.) in block 608. Thereafter, or if the lower power mode is not permitted by the minimum required power mode, as determined in decision block 606, the process returns to block 602 and repeats as previously described. As will be appreciated by those skilled in the art, various events will put the communications device in a higher power mode (e.g., active power mode, sleep mode, etc.), such as the activation of various applications, the receipt of an incoming communications session (e.g., voice, data, multimedia or a combination thereof) or initiation of and outgoing communications session (e.g., voice, data, multimedia or a combination thereof).

Figure 7:
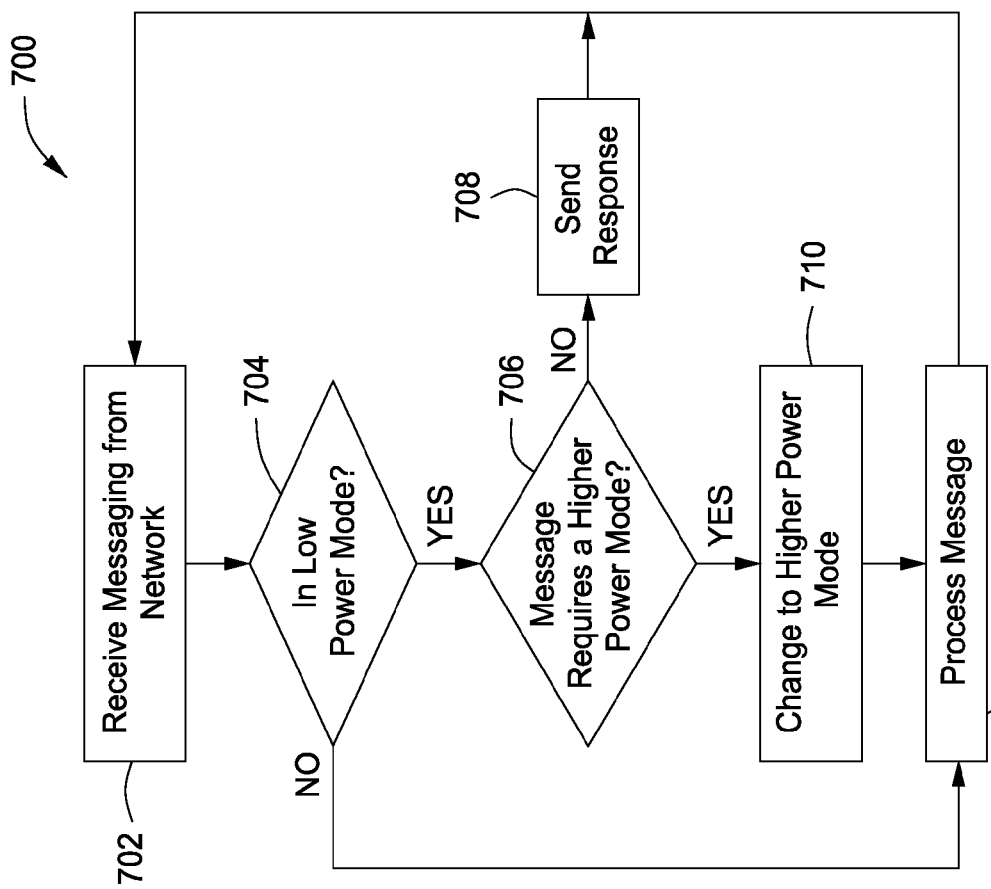
FIG. 7 is a flow chart of a power management process of a single or dual mode communications device in accordance with yet another embodiment of the present invention.

Referring now to FIG. 7, a flow chart of a power management process 700 of a single or dual mode communications device in accordance with another embodiment of the present invention is shown. The power management process 700 receives a message (e.g., a digital signal, an analog signal, a communications packet, a communications signal, etc.) from a network in block 702. The network can be a VoIP network (e.g., an unlicensed mobile access network) and/or a cellular network. If the communications device is not operating in a low power mode (e.g., sleep power mode, deep sleep mode, etc.), as determined in decision block 704, the communications device processes the message in block 712. If, however, the communications device is operating in a low power mode, as determined in decision block 704, and the message does not require a higher power mode (e.g., sleep power mode, active power mode, etc.) as determined in decision block 706, the communications device sends a response to the message in block 708 without changing the power mode. Typically, the message does not require the change whenever the message comprises a signaling message, a control message, an "are you there" message or other message related to a connection to the network. Thereafter, the process returns to block 702 to wait on the next message and repeat the process as described. If, however, the message requires the higher power mode, as determined in decision block 706, the communications device changes to the higher power mode in block 710 and processes the message in block 712. Thereafter, the process returns to block 702 to wait on the next message and repeat the process as described. The process may also transmit a "keep alive" message or other message required to maintain a connection to the network.

Figure 8A:
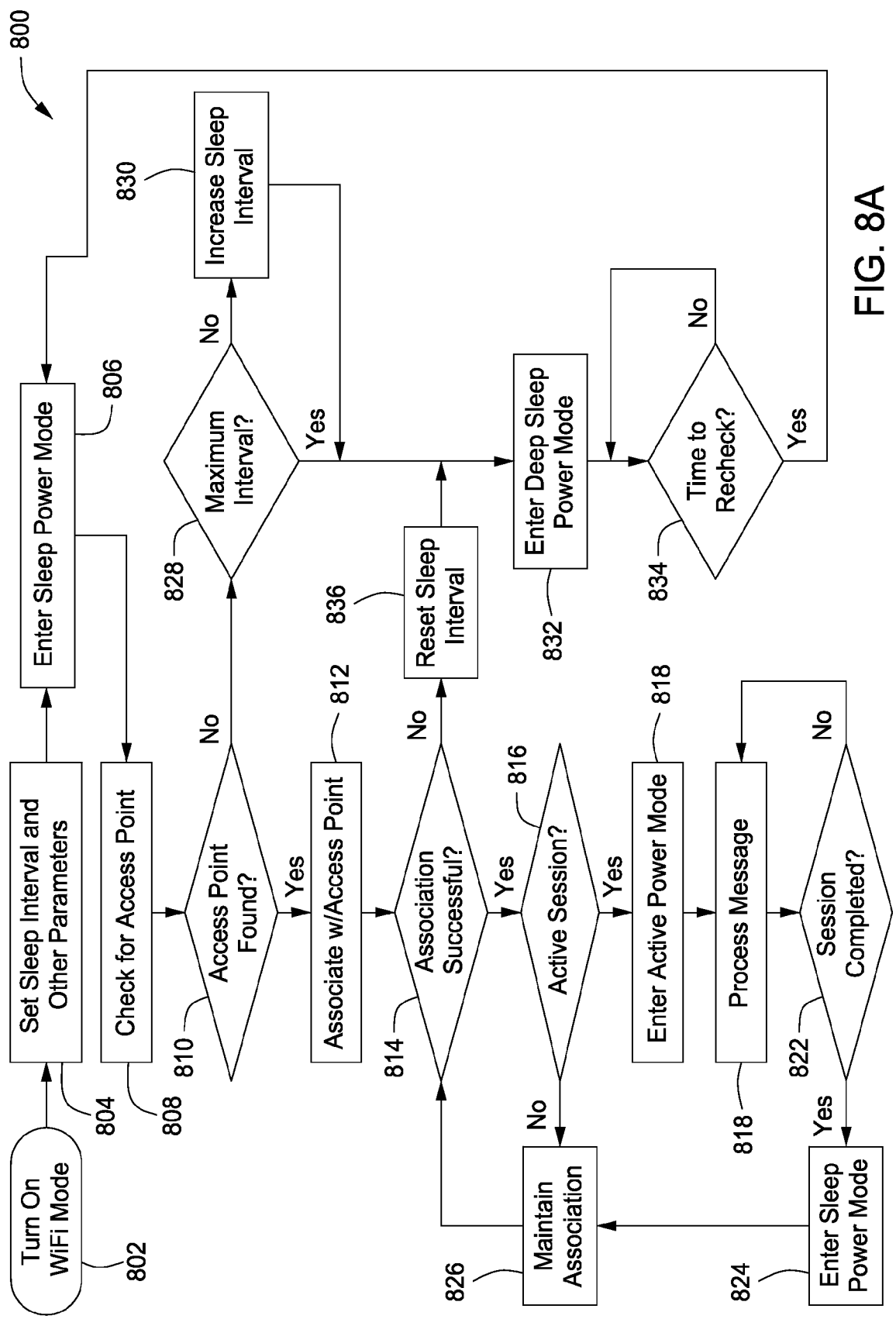
FIGS. 8A and 8B are flow charts of a power management process of a dual mode communications device in accordance with one embodiment of the present invention.
Figure 8B:
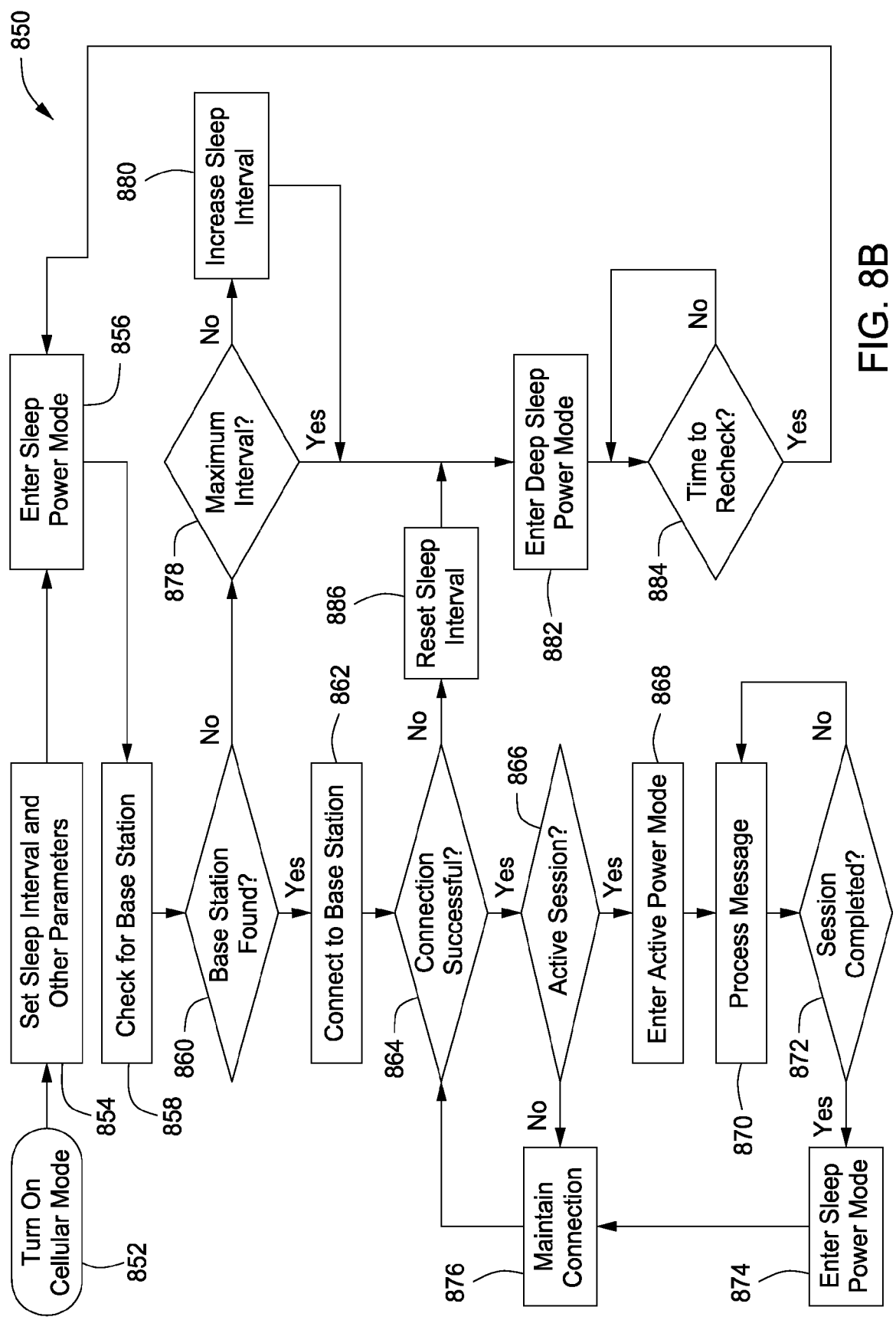

Now referring to FIGS. 8A and 8B, flow charts of a power management process 800 (WiFi mode) and 850 (cellular mode) of a cellular/UMA dual mode device in accordance with one embodiment of the present invention is shown. The WiFi (VoIP) mode is turned on in block 802. A sleep interval and other parameters are set in block 804 and the VoIP module enters a sleep power mode in block 806. The device checks for an access point in block 808. If an access point is found, as determined in decision block 810, the device associates with the access point in block 812. If the association is successful, as determined in decision block 814, and there is an active session, as determined in decision block 816, the VoIP module enters an active power mode in block 818. The messages are then processed in block 820 until the session is completed, as determined in decision block 822. After the session is completed, the VoIP module enters the sleep power mode in block 824. Thereafter, or if there is no active session, as determined in decision block 816, the device maintains the association with the access point in block 826. If the association with the access point is unsuccessful, dropped, terminated or otherwise ended, as determined in decision block 814, the sleep interval (e.g., ten seconds) is reset in block 836. If, however, an access point is not found, as determined in decision block 810, and a maximum sleep interval (e.g., ten minutes) has not be reached, as determined in decision block 828, the sleep interval is increased in block 830. The sleep interval can be increased in accordance with a pattern, a preset increment, a dynamic increment or a combination thereof. Thereafter, or if the maximum sleep interval has been reached, as determined in decision block 828, the VoIP module enters a deep sleep power mode in block 832. The VoIP module remains in the deep sleep power mode for the sleep interval, as determined in decision block 834. Thereafter, VoIP module enters the sleep power mode in block 806 and the process repeats as previously described. Note that other minimum or maximum sleep intervals can be used. The process 800 may also include determining whether any applications are incompatible with the sleep or deep sleep power mode prior to entering the lower power mode, and entering the lower power mode only when no applications are incompatible with the low power mode. Moreover, the process 800 may include receiving one or more communications from the network, and adjusting the power mode based on the received communications.

Similarly, the cellular mode is turned on in block 852. A sleep interval and other parameters are set in block 854 and the cellular module enters a sleep power mode in block 856. The device checks for a base station in block 858. If a base station is found, as determined in decision block 860, the device connects with the base station in block 862. If the connection is successful, as determined in decision block 864, and there is an active session, as determined in decision block 866, the cellular module enters an active power mode in block 868. The messages are then processed in block 870 until the session is completed, as determined in decision block 872. After the session is completed, the cellular module enters the sleep power mode in block 874. Thereafter, or if there is no active session, as determined in decision block 866, the device maintains the connection with the base station in block 876. If the connection with the base station is unsuccessful, dropped, terminated or otherwise ended, as determined in decision block 864, the sleep interval (e.g., ten seconds) is reset in block 886. If, however, a base station is not found, as determined in decision block 860, and a maximum sleep interval (e.g., ten minutes) has not be reached, as determined in decision block 878, the sleep interval is increased in block 880. The sleep interval can be increased in accordance with a pattern, a preset increment, a dynamic increment or a combination thereof. Thereafter, or if the maximum sleep interval has been reached, as determined in decision block 878, the cellular module enters a deep sleep power mode in block 882. The VoIP module remains in the deep sleep power mode for the sleep interval, as determined in decision block 884. Thereafter, cellular module enters the sleep power mode in block 856 and the process repeats as previously described. Note that other minimum or maximum sleep intervals can be used. The process 850 may also include determining whether any applications are incompatible with the sleep or deep sleep power mode prior to entering the lower power mode, and entering the lower power mode only when no applications are incompatible with the low power mode. Moreover, the process 850 may include receiving one or more communications from the network, and adjusting the power mode based on the received communications.

Figure 9A:
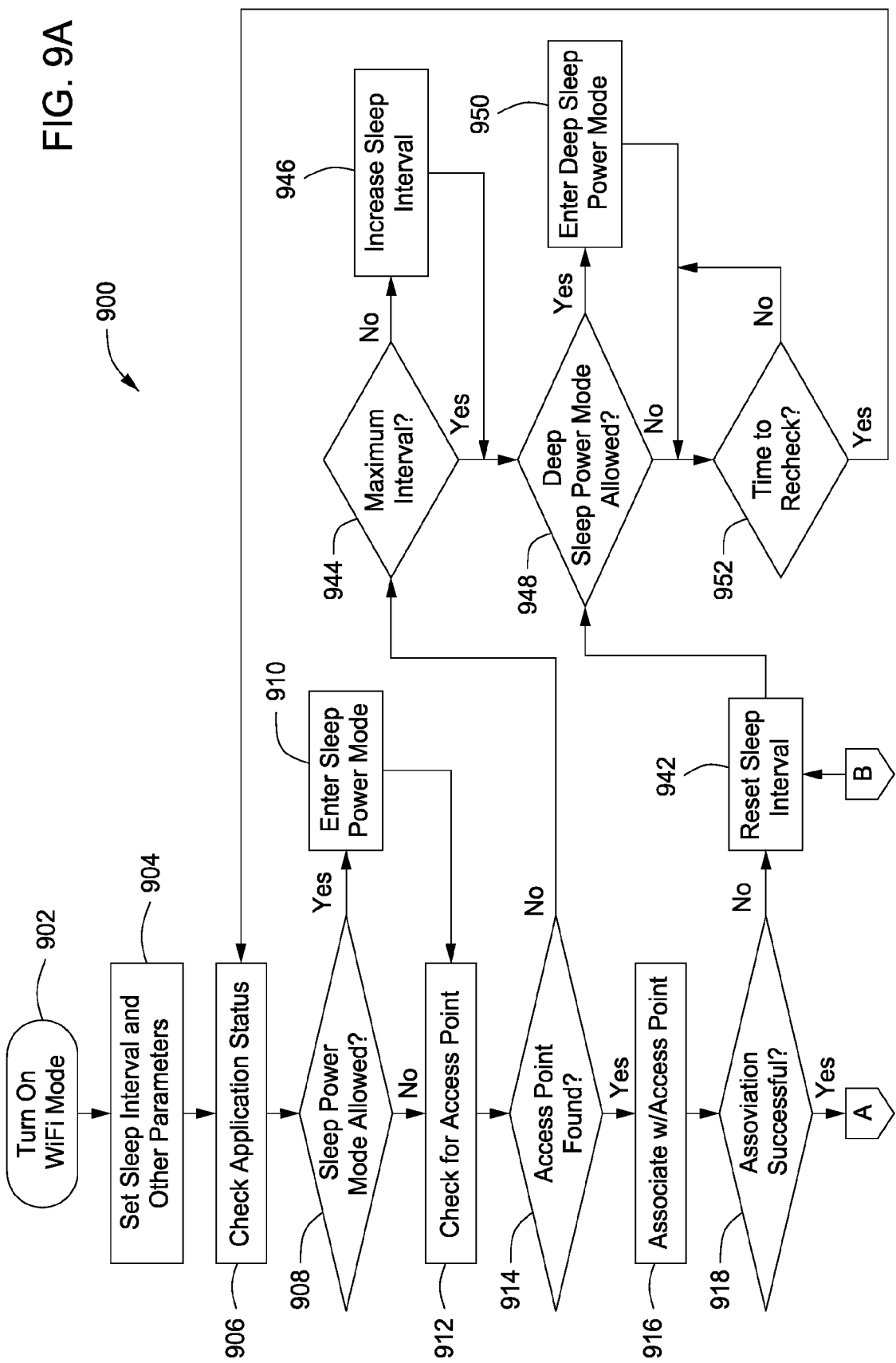
FIGS. 9A and 9B are flow charts of a power management process of a dual mode communications device in accordance with another embodiment of the present invention.
Figure 9B:
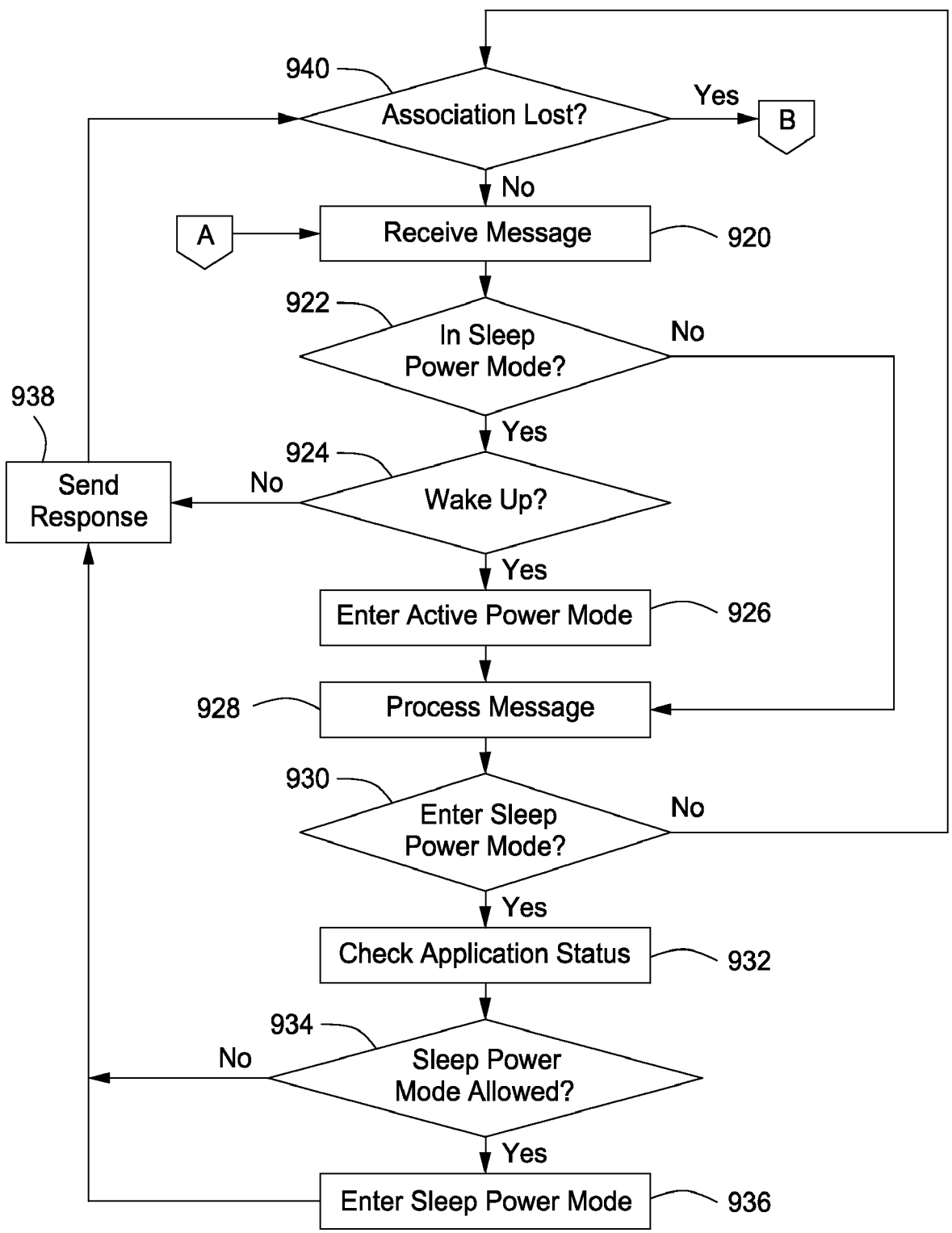

Referring now to FIGS. 9A and 9B, flow charts of a power management process 900 of a UMA mode of a communications device in accordance with another embodiment of the present invention is shown. The WiFi (VoIP) mode is turned on in block 902. A sleep interval and other parameters are set in block 904 and the power management module check the status of one or more applications in block 906. If, the sleep power mode is allowed for the one or more applications based on the status check, as determined in decision block 908, the VoIP module enters a sleep power mode in block 910. Thereafter, or if the sleep mode is not allowed, as determined in decision block 908, the VoIP module checks for an access point in block 912. If an access point is found, as determined in decision block 914, the device associates with the access point in block 916. If the association is successful, as determined in decision block 918, a message is received in block 920. If the VoIP module is in sleep power mode, as determined in decision block 922, and the VoIP module needs to wake up, as determined in decision block 924, the VoIP enters active power mode in block 926. Thereafter, or if the VoIP module is not in sleep power mode, as determined in decision block 922, the message is processed in block 928. Once the message processing is complete and the VoIP module should enter sleep power mode, as determined in decision block 930, the power management module check the status of one or more applications in block 932. If, the sleep power mode is allowed for the one or more applications based on the status check, as determined in decision block 934, the VoIP module enters a sleep power mode in block 936. Thereafter, or if the sleep power mode is not allowed, as determined in decision block 934, or the VoIP module does not need to wake up, as determined in decision block 924, the VoIP module sends a response in block 938. Thereafter, or if the VoIP module is not to enter the sleep power mode, as determined in decision block 930, and the association is not lost, as determined in decision block 940, the process loop back to block 920 where the next message is received and the process continues as previously described. If, however, the association is lost, as determined in decision block 940, or the association is not successful, as determined in decision block 918, the sleep interval (e.g., ten seconds) is reset in block 942. If, however, an access point is not found, as determined in decision block 914, and a maximum sleep interval (e.g., ten minutes) has not be reached, as determined in decision block 944, the sleep interval is increased in block 946. The sleep interval can be increased in accordance with a pattern, a preset increment, a dynamic increment or a combination thereof. Thereafter, or if the maximum sleep interval has been reached, as determined in decision block 944, and the deep sleep power mode is allowed, as determined in decision block 948, the VoIP module enters a deep sleep power mode in block 950. The VoIP module remains in the deep sleep power mode for the sleep interval, as determined in decision block 952. Thereafter, the process loops back to block 906 to check the application status and the process repeats as previously described. Note that other minimum or maximum sleep intervals can be used.

Figure 10:
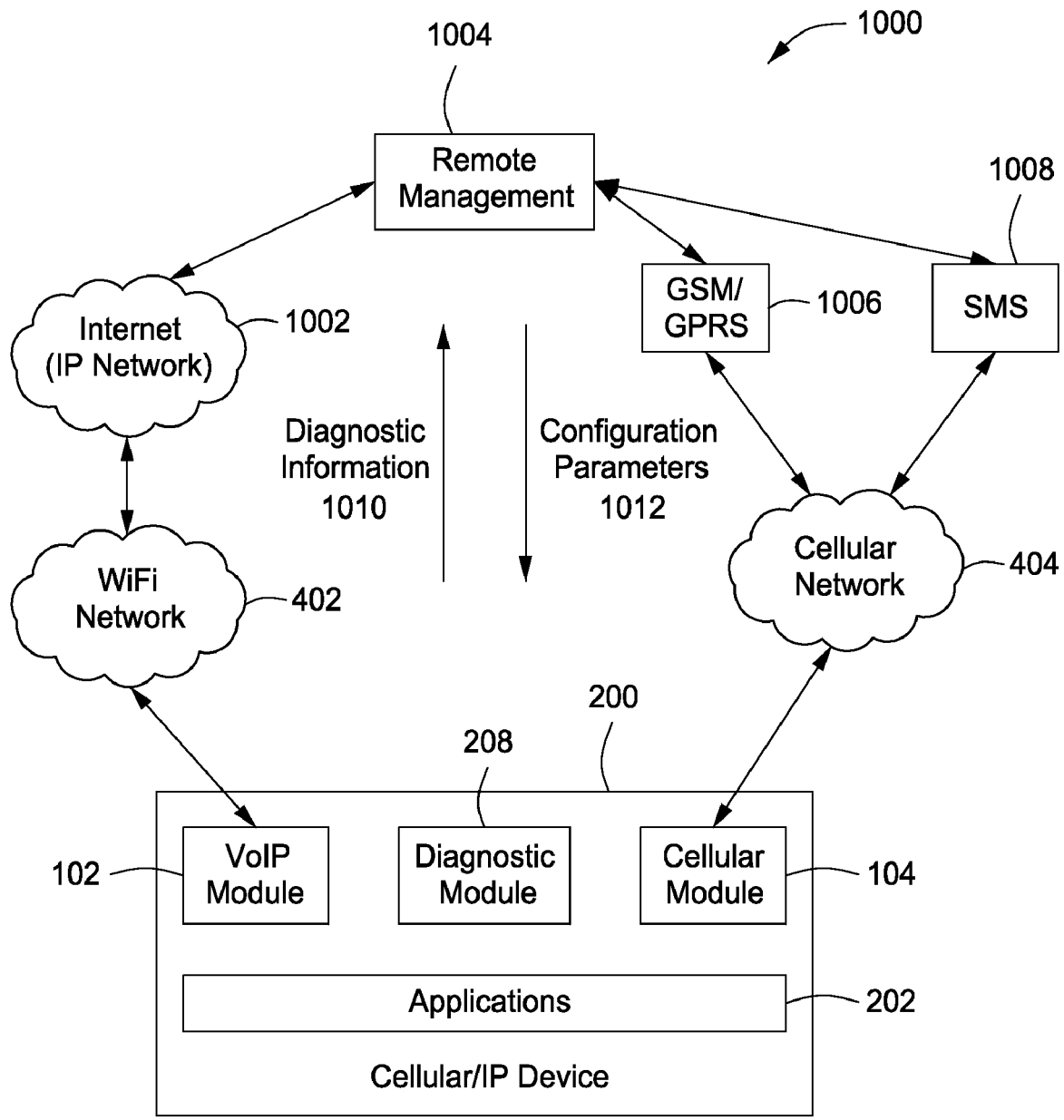
FIG. 10 is a block diagram of a system for remotely managing one or more communications devices in accordance with one embodiment of the present invention.

Now referring to FIG. 10, a block diagram of a system 1000 for remotely managing one or more communications devices 200 in accordance with one embodiment of the present invention is shown. The dual mode communications device 200 can communicate with a VoIP network 402 (e.g., unlicensed mobile access network, WiFi network, Internet, wireless gateway/modem (DSL, ADSL, cable, satellite), etc.) and/or a cellular network 404. The dual mode communications device 200 includes a VoIP module 102, a cellular module 104, a diagnostic module 208 and one or more applications 202. The mobile communications device 200 can communicate with a remote manager or remote management server 1004 via: (a) the VoIP network 402 and Internet (IP Network) 1002; (b) the cellular network 404 and GSM/GPRS server 1006; and/or (c) the cellular network 404 and SMS server 1008. The diagnostic module 208 obtains data 1010 regarding the communications device 200, selects a communications protocol and either the VoIP module 102 or the cellular module 104, creates a first message containing the data 1010 using the selected communications protocol and sends the first message to the remote manager 1004 via the selected module. The data 1010 may include diagnostic information, operational information, performance information, network information, status information, software information, firmware information, hardware information, user information, version information, virus information, data integrity information, data access information, security information, location information, authentication information or a combination thereof.

The remote manager 1004 receives the first message containing data 1010 obtained from the communications device 200, analyzes the data 1010 from the first message, creates the configuration parameters 1012, creates the second message containing the configuration parameters 1012 and sends the second message to the communications device 200. The configuration parameters 1012 may include device settings, network settings, SIP settings, cellular settings, WiFi settings, firmware management settings, software patches, fixes, upgrades, commands, instructions, tests, diagnostics, a device "kill" command, a data wipe command or a combination thereof. For example, if the device is lost or stolen, the present invention can be used to determine whether sensitive information has been accessed, "kill" the device, wipe sensitive data from the device or take other actions to prevent unauthorized access or use of the device and the data stored on it. The configuration parameters 1012 may also temporarily allow the remote manager 1004 to control the communications device 200. The communications device 200 receives the second message containing one or more configuration parameters 1012 from the remote manager 1004 via the selected module and implements the configuration parameters 1012. The configuration parameters 1012 can be implemented automatically, by a user of the communications device 200, a person associated with a network, by the remote manager 1004 or a combination thereof. The various remote management methods are described below in reference to FIGS. 11-15. Note that the methods can be implemented using a computer program embodied on a computer readable medium wherein each step is preformed by one or more code segments.

Figure 11:
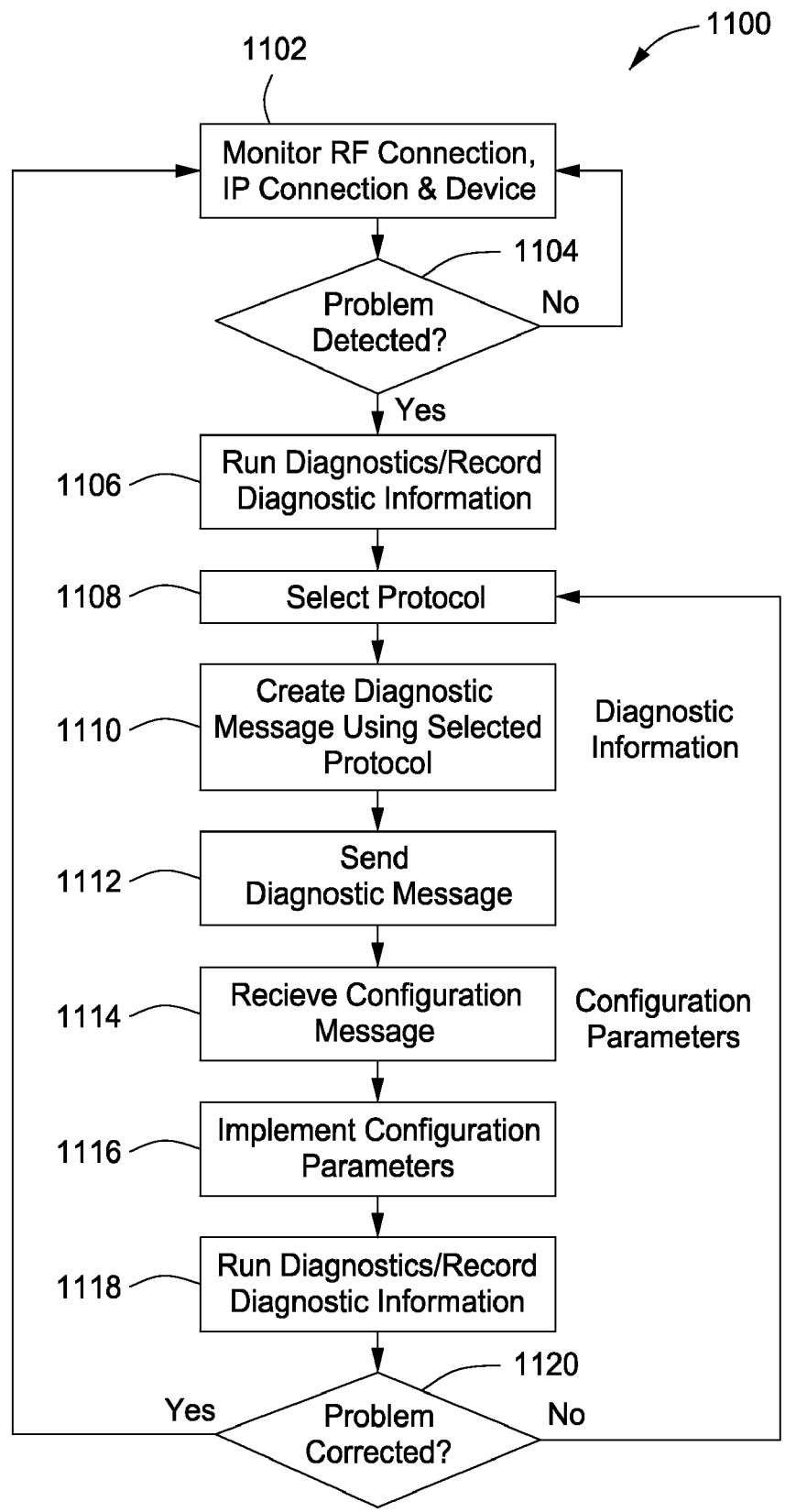
FIG. 11 is a flow chart of a remote management process on a communications device in accordance with one embodiment of the present invention.

Referring now to FIG. 11, a flow chart of a remote management process 1100 on a communications device 200 in accordance with one embodiment of the present invention is shown. The process 1100 monitors the cellular connection, IP connection and/or the communications device 200 in block 1102. During the monitoring process 1102, data regarding the communications device and/or the network connections is obtained until a problem is detected, as determined in decision block 1104. The data may include diagnostic information, operational information, performance information, network information, status information, software information, firmware information, hardware information, user information, version information, virus information, data integrity information, data access information, security information, location information, authentication information or a combination thereof. Alternatively, the process can be initiated periodically or by a user of the communications device or by the remote manager, instead of being initiated by a problem. If a problem is detected, as determined in decision block 1104, one or more diagnostics are run and the results are recorded in block 1106. A communications protocol (e.g., SMS, GSM/GPRS, IP, MMS, WAP, http, etc.) and either the VoIP module 102 or the 104 cellular module are selected in block 1108. Although the protocol can be selected by a variety of criteria, SMS will typically be the most efficient protocol for resolving a problem with the VoIP network 402 or the communications device 200. A first message containing the data 1010 is created using the selected communications protocol in block 1110 and the first message is sent to the remote manager 1004 via the selected module in block 1112. Thereafter a second message containing one or more configuration parameters 1012 is received from the remote manager 1004 via the selected module in block 1114. The configuration parameters 1012 may include device settings, network settings, SIP settings, cellular settings, WiFi settings, firmware management settings, software patches, fixes, upgrades, commands, instructions, tests, diagnostics, a device "kill" command, a data wipe command or a combination thereof. The configuration parameters 1012 are then implemented in block 1116. The configuration parameters 1012 can be implemented automatically, by a user of the communications device 200, a person associated with a network, by the remote manager 1004 or a combination thereof. In addition, the configuration parameters 1012 may temporarily allow the remote manager 1004 to control the communications device 200. One or more diagnostics are run and the results are recorded in block 1118. If the problem is not corrected, as determined in decision block 1120, the process loops back to block 1108 to select a protocol and repeat the communications with the remote manager 1004 until the problem is either solved or the process is terminated by the user or the remote manager 1004. If, however, the problem is corrected, as determined in decision block 1120, the process loops back to block 1102 to continue monitoring the connections and/or the device. Note that the process 1100 may also include encrypting the first message, decrypting the second message, or authenticating the remote manager.

Figure 12:
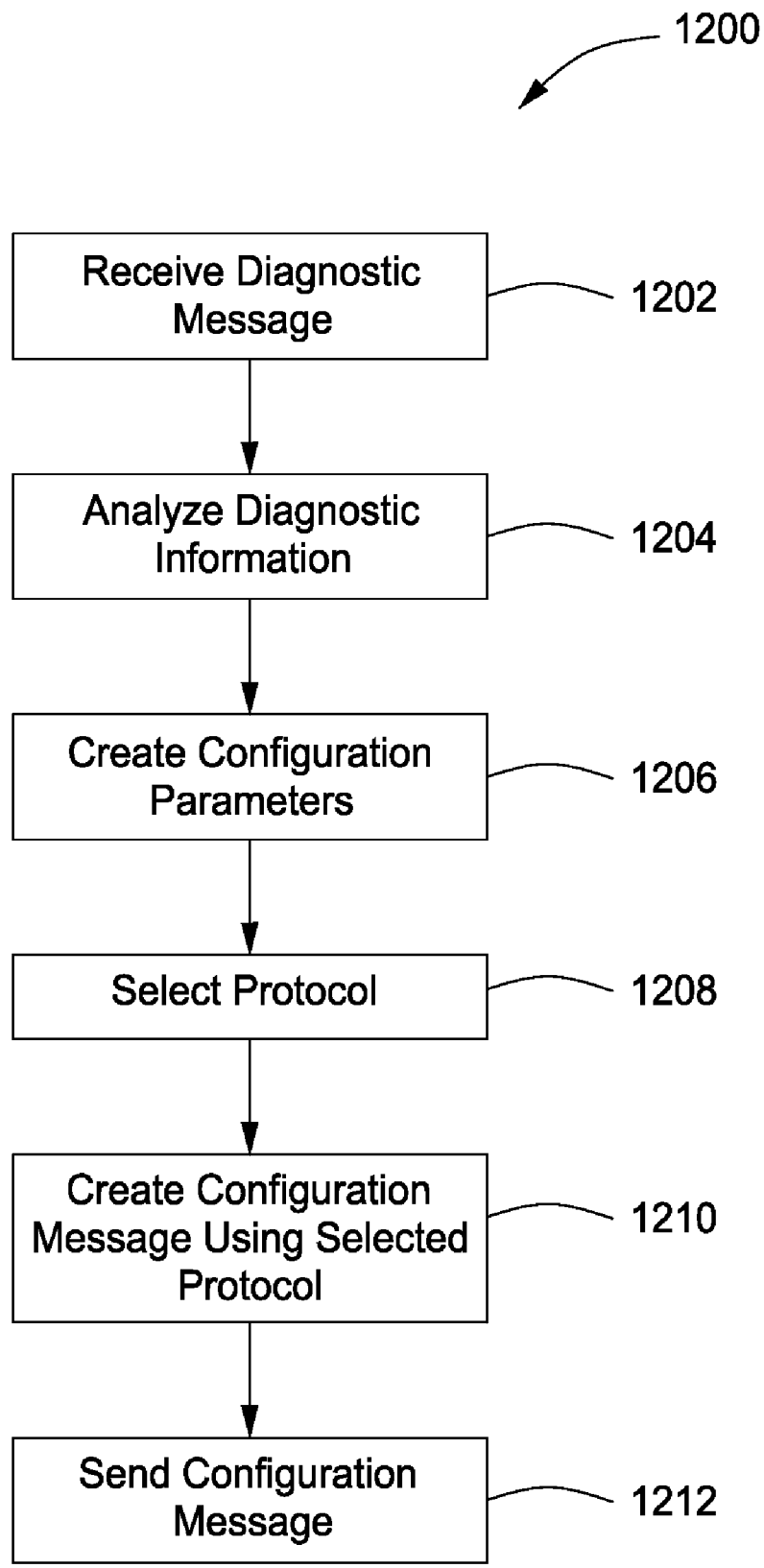
FIG. 12 is a flow chart of a remote management process on a remote management apparatus in accordance with one embodiment of the present invention.

Now referring to FIG. 12, a flow chart of a remote management process 1200 on a remote management apparatus 1004 in accordance with one embodiment of the present invention is shown. A first message containing data 1010 obtained from the communications device 200 is received in block 1202 and the data 1010 from the first message is analyzed in block 1204. The data 1010 may include diagnostic information, operational information, performance information, network information, status information, software information, firmware information, hardware information, user information, version information, virus information, data integrity information, data access information, security information, location information, authentication information or a combination thereof. One or more configuration parameters 1012 are created in block 1206 and a protocol is selected in block 1208. The configuration parameters 1012 may include device settings, network settings, SIP settings, cellular settings, WiFi settings, firmware management settings, software patches, fixes, upgrades, commands, instructions, tests, diagnostics, a device "kill" command, a data wipe command or a combination thereof. In addition, the configuration parameters 1012 may temporarily allow the remote manager 1104 to control the communications device 200. A second message containing the configuration parameters 1012 is created using the selected protocol in block 1210 and the second message is sent to the communications device 200 in block 1212. The process 300 may also include checking a status of one or more devices within a network, performing one or more tests on the devices within the network, changing one or more parameters of the devices within the network, alerting an operator, opening a report, logging the first message, logging the second message, closing the report, decrypting the first message, encrypting the second message, or authenticating the user device.

Figure 13:
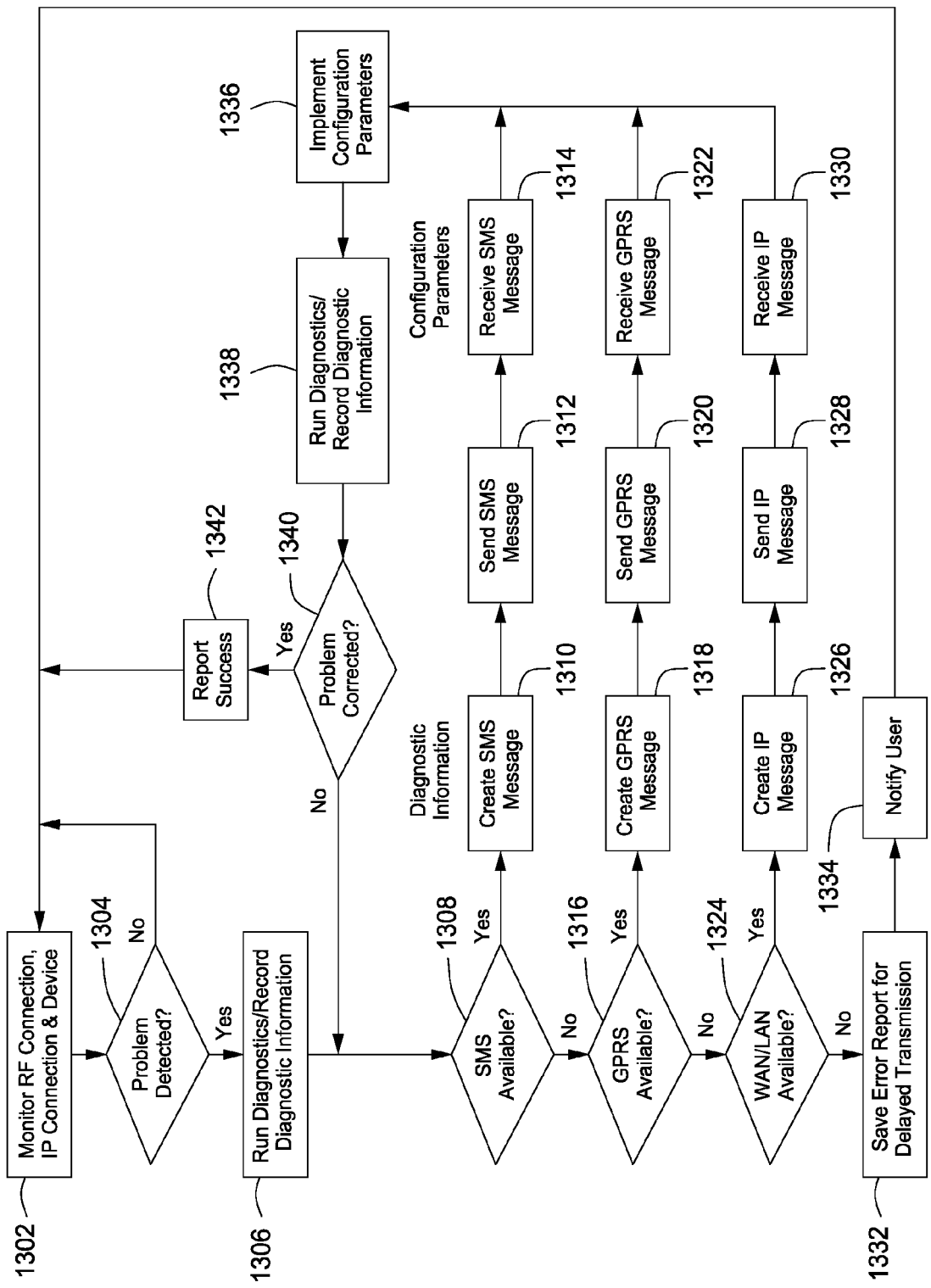
FIG. 13 is a flow chart of a remote management process on a communications device in accordance with another embodiment of the present invention.

Referring now to FIG. 13, a flow chart of a remote management process 1300 on a communications device 200 in accordance with another embodiment of the present invention is shown. The process 1300 monitors the cellular connection, IP connection and/or the communications device 200 in block 1302. During the monitoring process 402, data 1010 regarding the communications device 200 and/or the network connections is obtained until a problem is detected, as determined in decision block 1304. The data 1010 may include diagnostic information, operational information, performance information, network information, status information, software information, firmware information, hardware information, user information, version information, virus information, data integrity information, data access information, security information, location information, authentication information or a combination thereof. Alternatively, the process 402 can be initiated periodically or by a user of the communications device 200 or by the remote manager 1004, instead of being initiated by a problem.

If a problem is detected, as determined in decision block 1304, one or more diagnostics are run and the results are recorded in block 1306. If SMS communications are available, as determined in decision block 1308, a SMS message containing the data 1010 is created in block 1310 and the SMS message is sent to the remote manager in block 1312. Thereafter a SMS message containing one or more configuration parameters 1012 is received from the remote manager 1004 in block 1314. The configuration parameters 1012 may include device settings, network settings, SIP settings, cellular settings, WiFi settings, firmware management settings, software patches, fixes, upgrades, commands, instructions, tests, diagnostics, a device "kill" command, a data wipe command or a combination thereof. If SMS communications are not available, as determined in decision block 1308, and GPRS/GSM communications are available, as determined in decision block 1316, a GPRS/GSM message containing the data 1010 is created in block 1318 and the GPRS/GSM message is sent to the remote manager 1004 in block 1320. Thereafter a GPRS/GSM message containing one or more configuration parameters 1012 is received from the remote manager 1004 in block 1322. If GPRS/GSM communications are not available, as determined in decision block 1316, and WAN/LAN communications are available, as determined in decision block 1324, an IP message containing the data 1010 is created in block 1326 and the IP message is sent to the remote manager 1004 in block 1328. Thereafter an IP message containing one or more configuration parameters 1012 is received from the remote manager 1004 in block 1330. If, however, WAN/LAN communications are not available, as determined in decision block 1324, an error report is saved for future transmission to the network manager once one of the networks becomes available in block 1332. The user is notified of the transmission failure in block 1334 and the process loops back to block 1302 to continue monitoring the device and/or the connections.

After the message containing the configuration parameters 1012 is received from the remote manager 1004 in block 1314, 1322 or 1330, the configuration parameters 1012 are implemented in block 1336. The configuration parameters 1012 can be implemented automatically, by a user of the communications device 200, a person associated with a network, by the remote manager 1004 or a combination thereof. In addition, the configuration parameters 1012 may temporarily allow the remote manager 1004 to control the communications device 200. One or more diagnostics are run and the results are recorded in block 1338. If the problem is not corrected, as determined in decision block 1340, the process loops back to decision blocks 408, 416 and 424 to select a protocol and repeat the communications with the remote manager 1004 until the problem is either solved or the process is terminated by the user or the remote manager 1004. If, however, the problem is corrected, as determined in decision block 1340, the success is reported in block 1342 and the process loops back to block 1302 to continue monitoring the connections and/or the device 200. Note that the process 1300 may also include encrypting the first message, decrypting the second message, or authenticating the remote manager.

Figure 14:
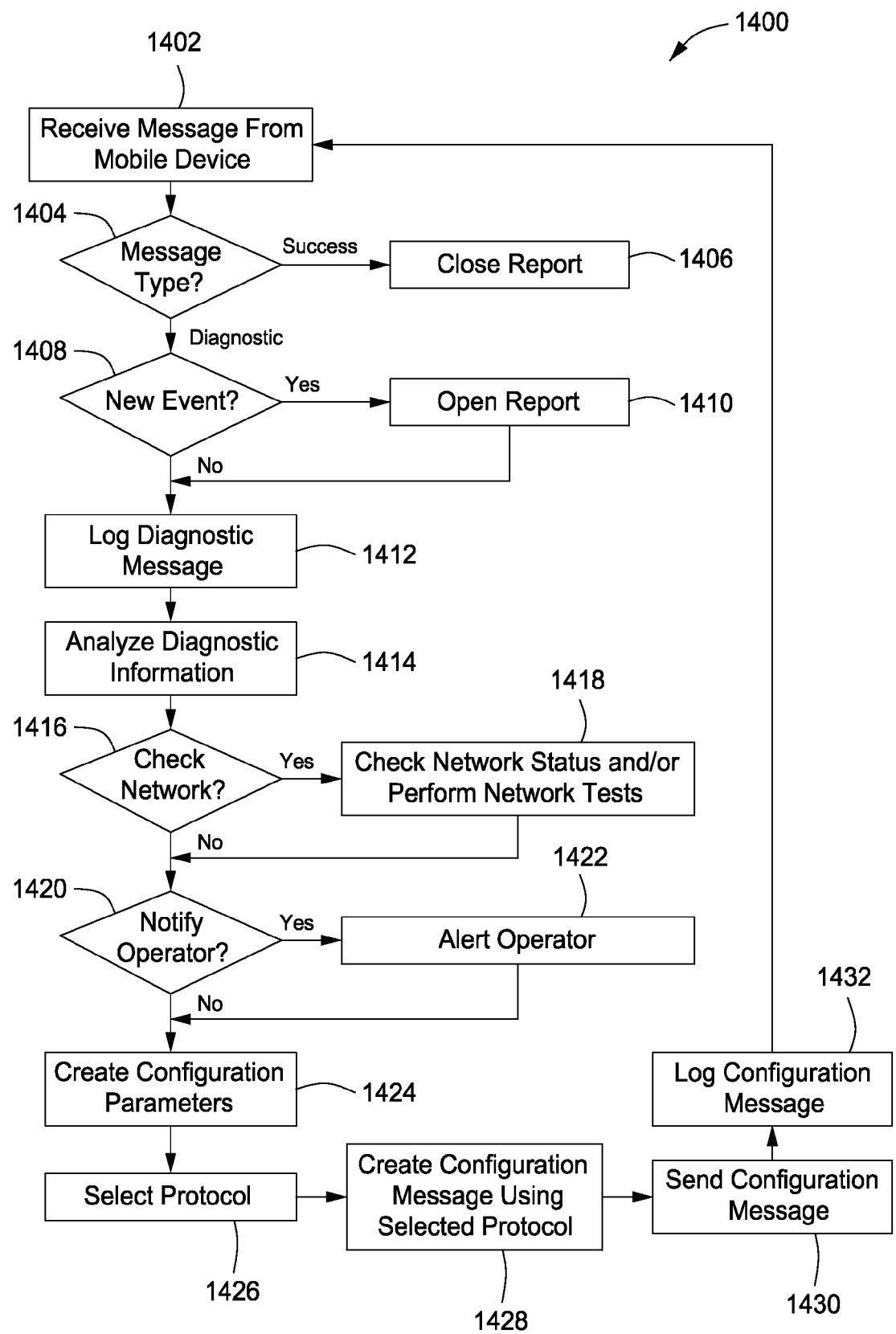
FIG. 14 is a flow chart of a remote management process on a remote management apparatus in accordance with another embodiment of the present invention.

Now referring to FIG. 14, a flow chart of a remote management process 1400 on a remote management apparatus 1004 in accordance with another embodiment of the present invention is shown. A first message containing data 1010 obtained from the communications device 200 is received in block 1402. If the first message is a success message, as determined in decision block 1404, a previously opened report is closed in block 1406. If, however, the first message is a diagnostic message, as determined in decision block 1404, and the event is new, as determined in decision block 1408, a new report is opened in block 1410. Thereafter or if the event is not new, as determined in decision block 1408, the diagnostic message is logged in block 1412 and the data 1010 from the diagnostic message is analyzed in block 1414. The data 1010 may include diagnostic information, operational information, performance information, network information, status information, software information, firmware information, hardware information, user information, version information, virus information, data integrity information, data access information, security information, location information, authentication information or a combination thereof.

If the data 1010 indicates that the network should be checked, as determined in decision block 1416, the status of one or more devices within the network are checked and/or one or more tests are performed on the devices within the network and/or one or more parameters of the devices within the network are changed in block 1418. Thereafter, or if the data does not indicate that the network should be checked, as determined in decision block 1416, and if the data indicates that the operator should be notified, as determined in decision block 1420, the operator is alerted in block 1422. Thereafter, or if the operator does not need to be notified, as determined in decision block 1420, one or more configuration parameters 1012 are created in block 1424 and a protocol is selected in block 1426. The configuration parameters 1012 may include device settings, network settings, SIP settings, cellular settings, WiFi settings, firmware management settings, software patches, fixes, upgrades, commands, instructions, tests, diagnostics, a device "kill" command, a data wipe command or a combination thereof. In addition, the configuration parameters 1012 may temporarily allow the remote manager 1004 to control the communications device 200. A configuration message containing the configuration parameters 1012 is created using the selected protocol in block 1428 and the configuration message is sent to the communications device 200 in block 1430. The configuration messaged is logged in block 1432 and the process loops back to block 1402 to receive the next diagnostic or success message. The process 1400 may also include decrypting the diagnostic message, encrypting the configuration message, or authenticating the user device.

Figure 15:
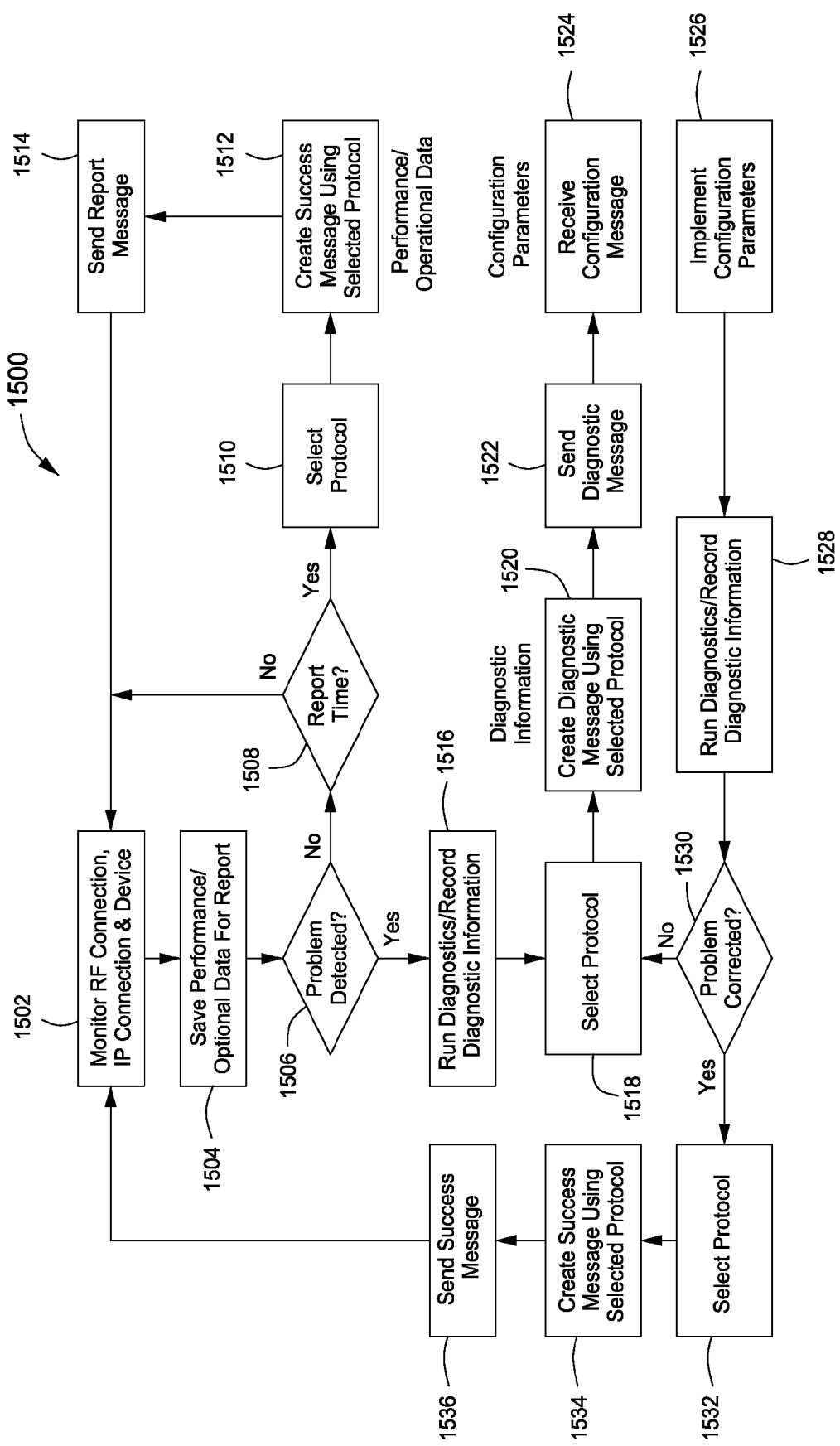
FIG. 15 is a flow chart of a remote management process on a communications device in accordance with another embodiment of the present invention.

Referring to FIG. 15, a flow chart of a remote management process 1500 on a communications device 200 in accordance with another embodiment of the present invention is shown. The process 1500 monitors the cellular connection, IP connection and/or the communications device 200 in block 1502. During the monitoring process 602, data 1010 regarding the communications device 200 and/or the network connections is obtained and performance/operational data are saved for future reporting in block 1504. This process continues until a problem is detected, as determined in decision block 1506 or it is time to report the saved data, as determined in decision block 1508. The data 1010 may include diagnostic information, operational information, performance information, network information, status information, software information, firmware information, hardware information, user information, version information, virus information, data integrity information, data access information, security information, location information, authentication information or a combination thereof. Alternatively, the diagnostic process or the reporting process can be initiated periodically or by a user of the communications device or by the remote manager.

If it is time to report the data 1010, as determined in decision block 1508, a protocol is selected in block 1510, a report message containing the performance/operational data is created in block 1512 and the report message is sent in block 1514, Thereafter, the process continues to monitor as save data as previously described. If a problem is detected, as determined in decision block 1506, one or more diagnostics are run and the results are recorded in block 1516. A communications protocol (e.g., SMS, GSM/GPRS, IP, MMS, WAP, http, etc.) and either the VoIP module or the cellular module are selected in block 1518. Although the protocol can be selected by a variety of criteria, SMS will typically be the most efficient protocol for resolving a problem with the VoIP network 402 or the communications device 200. A diagnostic message containing the data 1010 is created using the selected communications protocol in block 1520 and the diagnostic message is sent to the remote manager 1004 via the selected module in block 1522. Thereafter a configuration message containing one or more configuration parameters 1012 is received from the remote manager 1004 via the selected module in block 1524. The configuration parameters 1012 may include device settings, network settings, SIP settings, cellular settings, WiFi settings, firmware management settings, software patches, fixes, upgrades, commands, instructions, tests, diagnostics, a device "kill" command, a data wipe command or a combination thereof.

The configuration parameters 1012 are then implemented in block 1526. The configuration parameters 1012 can be implemented automatically, by a user of the communications device 200, a person associated with a network, by the remote manager 1004 or a combination thereof. In addition, the configuration parameters 1012 may temporarily allow the remote manager 1004 to control the communications device 200. One or more diagnostics are run and the results are recorded in block 1528. If the problem is not corrected, as determined in decision block 1530, the process loops back to block 1518 to select a protocol and repeat the communications with the remote manager 1004 until the problem is either solved or the process is terminated by the user or the remote manager 1004. If, however, the problem is corrected, as determined in decision block 1530, a protocol is selected in block 1532, a success message is created using the selected protocol in block 1534, the success message is sent to the remote manager 1004 in block 1536 and the process loops back to block 1502 to continue monitoring the connections and/or the device. Note that the process 1500 may also include encrypting the first message, decrypting the second message, or authenticating the remote manager.

Although preferred embodiments of the present invention have been described in detail, it will be understood by those skilled in the art that various modifications can be made therein without departing from the spirit and scope of the invention as set forth in the appended claims.

What is claimed is:

1. A method of using one or more VoIP-based applications and one or more cellular-based applications in a communications device having a VoIP module and a cellular module, comprising the steps of:
receiving an instruction from the VoIP-based applications or the cellular-based applications at a single application program interface communicably coupled to the VoIP-based applications, the cellular-based applications, the VoIP module and the cellular module;
processing the instruction into one or more VoIP-based commands and providing the VoIP-based commands to the VoIP module whenever the communications device is operating in a VoIP mode;
processing the instruction into one or more cellular-based commands and providing the cellular-based commands to the cellular module whenever the communications device is operating in a cellular mode;
receiving a command from the VoIP module or the cellular module at the single application program interface;
determining whether the command is to be provided to one of the VoIP-based applications or one of the cellular-based applications;
processing the command into one or more VoIP-based instructions and providing the VoIP-based instructions to the VoIP-based application whenever the command is to be provided to the VoIP-based application;
processing the command into one or more cellular-based instructions and providing the cellular-based instructions to the cellular-based application whenever the command is to be provided to the cellular-based application;
monitoring a minimum required power mode for each application running on the communications device;
determining whether the minimum required power mode permits a lower power mode; and
changing to the lower power mode whenever the lower power mode is permitted by the minimum required power mode.

2. The method as recited in claim 1, further comprising the steps of:
determining whether a network is accessible;
connecting to the network whenever the network is accessible;
entering a low power mode and remaining in the low power mode for a time period whenever the network is not accessible;
entering a higher power mode upon expiration of the time period and repeating the network determination step; and
increasing the time period whenever the network is repeatedly not accessible.

3. The method as recited in claim 2, further comprising the steps of:
determining whether any of the VoIP-based applications or the cellular-based applications are incompatible with the low power mode prior to entering the low power mode; and
entering the low power mode only when no applications are incompatible with the low power mode.

4. The method as recited in claim 2, wherein:
the time period is increased in accordance with a pattern, a preset increment, a dynamic increment or a combination thereof;
the time period is reset whenever the network is accessible;
the time period has a minimum value and a maximum value;
the time period is greater than or equal to ten seconds and less than or equal to ten minutes;
the low power mode comprises a deep sleep power mode or a sleep power mode;
the higher power mode comprises the sleep power mode or an active power mode;
the power mode is adjusted based on a communications received from the network; or
the network comprises a cellular network, an unlicensed mobile access network or both.

5. The method as recited in claim 1, wherein:
the step of monitoring the minimum required power mode for each application comprises the steps of determining the minimum required power mode for each application running on the communications device and saving the minimum required power mode for each application in a memory of the communications device;

the step of determining whether a lower power mode is permitted is performed periodically, or whenever there is a change in the minimum required power mode, or a combination thereof; or the lower power mode comprises a deep sleep power mode or a sleep power mode.

6. The method as recited in claim 1, further comprising the steps of:

receiving a message from a network while the communications device is operating in a low power mode;

determining whether the message requires a higher power mode;

responding to the message without changing the power mode whenever the message does not require the higher power mode; and changing to the higher power mode whenever the message requires the higher power mode.

7. The method as recited in claim 1, further comprising the steps of:

obtaining data regarding the communications device;

selecting a communications protocol and either the VoIP module or the cellular module;

creating a first message containing the data using the selected communications protocol;

sending the first message to a remote manager via the selected module;

receiving a second message containing one or more configuration parameters from the remote manager via the selected module; and implementing the configuration parameters.

8. The method as recited in claim 7, wherein the remote manager:

receives the first message containing data obtained from the communications device;

analyzes the data from the first message;

creates one or more configuration parameters;

creates the second message containing the configuration parameters; and sends the second message to the communications device.

9. The method as recited in claim 1, wherein:

the one or more IP-based applications comprise a VoIP client, an Internet Browser, an e-mail application, a non-cellular-based application or a combination thereof;

the one or more cellular-based applications comprises a phone book, a SMS application, a MMS application or a combination thereof;

the single application program interface processes all received commands into one or more AT commands; or the communications device accepts and runs one or more new IP-based applications or cellular-based applications without customizations or modifications.

10. A computer readable storage medium for using one or more VoIP-based applications and one or more cellular-based applications in a communications device having a VoIP module and a cellular module, the computer readable storage comprising program instructions when executed by a processor causes the processor to perform the steps of:

receiving an instruction from the VoIP-based applications or the cellular-based applications at a single application program interface communicably coupled to the VoIP-based applications, the cellular-based applications, the VoIP module and the cellular module;

processing the instruction into one or more VoIP-based commands and providing the VoIP-based commands to the VoIP module whenever the communications device is operating in a VoIP mode;

processing the instruction into one or more cellular-based commands and providing the cellular-based commands to the cellular module whenever the communications device is operating in a cellular mode;

receiving a command from the VoIP module or the cellular module at the single application program interface;

determining whether the command is to be provided to one of the VoIP-based applications or one of the cellular-based applications;

processing the command into one or more VoIP-based instructions and providing the VoIP-based instructions to the VoIP-based application whenever the command is to be provided to the VoIP-based application;

processing the command into one or more cellular-based instructions and providing the cellular-based instructions to the cellular-based application whenever the command is to be provided to the cellular-based application;

monitoring a minimum required power mode for each application running on the communications device;

determining whether the minimum required power mode permits a lower power mode; and changing to the lower power mode whenever the lower power mode is permitted by the minimum required power mode.

11. The computer readable storage medium as recited in claim 10, wherein:

the step of monitoring the minimum required power mode for each application comprises the steps of determining the minimum required power mode for each application running on the communications device and saving the minimum required power mode for each application in a memory of the communications device;

the step of determining whether a lower power mode is permitted is performed periodically, or whenever there is a change in the minimum required power mode, or a combination thereof; or the lower power mode comprises a deep sleep power mode or a sleep power mode.

12. The computer readable storage medium as recited in claim 10, wherein:

the one or more IP-based applications comprise a VoIP client, an Internet Browser, an e-mail application, a non-cellular-based application or a combination thereof;

the one or more cellular-based applications comprises a phone book, a SMS application, a MMS application or a combination thereof;

the single application program interface processes all received commands into one or more AT commands; or the communications device accepts and runs one or more new IP-based applications or cellular-based applications without customizations or modifications.

13. A dual mode communications device comprising:

one or more VoIP-based applications;

a VoIP module;

one or more cellular-based applications;

a cellular module;

a single application program interface communicably coupled to the VoIP-based applications, the VoIP module, the cellular-based applications and the cellular module wherein the single application program interface receives an instruction from the VoIP-based applications or the cellular-based applications, processes the instruction into one or more VoIP-based commands and provides the VoIP-based commands to the VoIP module whenever the communications device is operating in a VoIP mode, processes the instruction into one or more cellular-based commands and provides the cellular-based commands to the cellular module whenever the communications device is operating in a cellular mode, receives a command from the VoIP module or the cellular module, determines whether the command is to be provided to one of the VoIP-based applications or one of the cellular-based applications, processes the command into one or more VoIP-based instructions and provides the VoIP-based instructions to the VoIP-based application whenever the command is to be provided to the VoIP-based application, and processes the command into one or more cellular-based instructions and provides the cellular-based instructions to the cellular-based application whenever the command is to be provided to the cellular-based application; and a power management module that monitors a minimum required power mode for each application running on the communications device determines whether the minimum required power mode permits a lower power mode, and changes to the lower power mode whenever the lower power mode is permitted by the minimum required power mode.

14. The dual mode communications device as recited in claim 13, wherein:
the one or more IP-based applications comprise a VoIP client, an Internet Browser, an e-mail application, a non-cellular-based application or a combination thereof;
the one or more cellular-based applications comprises a phone book, a SMS application, a MMS application or a combination thereof;
the single application program interface processes all received commands into one or more AT commands; or
the communications device accepts and runs one or more new IP-based applications or cellular-based applications without customizations or modifications.

15. The dual mode communications device as recited in claim 13, further comprising a power management module that determines whether a network is accessible, connects to the network whenever the network is accessible, enters a low power mode and remains in the low power mode for a time period whenever the network is not accessible, enters a higher power mode upon expiration of the time period and repeating the network determination step, and increases the time period whenever the network is repeatedly not accessible.

16. The dual mode communications device as recited in claim 15, wherein:
the time period is increased in accordance with a pattern, a preset increment, a dynamic increment or a combination thereof;
the time period is reset whenever the network is accessible;
the time period has a minimum value and a maximum value;
the time period is greater than or equal to ten seconds and less than or equal to ten minutes;
the low power mode comprises a deep sleep power mode or a sleep power mode;
the higher power mode comprises the sleep power mode or an active power mode;
the power mode is adjusted based on a communications received from the network; or
the network comprises a cellular network, an unlicensed mobile access network or both.

17. The dual mode communications device as recited in claim 13, wherein the power management module determines whether any of the VoIP-based applications or the cellular-based applications are incompatible with the low power mode prior to entering the low power mode, and enters the low power mode only when no applications are incompatible with the low power mode.

18. The dual mode communications device as recited in claim 13, wherein:
the power management module monitors the minimum required power mode for each application by determining the minimum required power mode for each application running on the communications device and saving the minimum required power mode for each application in a memory of the communications device;
the power management module determines whether a lower power mode is permitted is performed periodically, or whenever there is a change in the minimum required power mode, or a combination thereof; or
the lower power mode comprises a deep sleep power mode or a sleep power mode.

19. The dual mode communications device as recited in claim 13, wherein the power management module receives a message from a network while the communications device is operating in a low power mode, determines whether the message requires a higher power mode, responds to the message without changing the power mode whenever the message does not require the higher power mode, and changes to the higher power mode whenever the message requires the higher power mode.

20. The dual mode communications device as recited in claim 19, wherein:
a "keep alive" message or other message required to maintain a connection to the network is transmitted in the low power mode;
the message comprises a digital signal, an analog signal, a communications packet or a communications signal;
the message does not require the change whenever the message comprises a signaling message, a control message, an "are you there" message or other message related to a connection to the network; or
the higher power mode comprises the sleep power mode or an active power mode.

21. The dual mode communications device as recited in claim 13, further comprising a diagnostic module that obtains data regarding the communications device, selects a communications protocol and either the VoIP module or the cellular module, creates a first message containing the data using the selected communications protocol, sends the first message to a remote manager via the selected module, receives a second message containing one or more configuration parameters from the remote manager via the selected module, and implements the configuration parameters.

22. The dual mode communications device as recited in claim 21, wherein the diagnostic module monitors a cellular connection, an IP connection, the communications device or a combination thereof, runs one or more diagnostics, records one or more results of the diagnostics, encrypts the first message, decrypts the second message, or authenticates the remote manager.

23. The dual mode communications device as recited in claim 21, wherein:
the data comprises diagnostic information, operational information, performance information, network information, status information, software information, firmware information, hardware information, user information, version information, virus information, data integrity information, data access information, security information, location information, authentication information or a combination thereof;

the communications protocol comprises SMS, GSM/ GPRS, IP, MMS, WAP or http;

the steps are initiated periodically, whenever a problem is detected, by a user of the communications device, by the remote manager or a combination thereof;

the configuration parameters comprise device settings, network settings, SIP settings, cellular settings, WiFi settings, firmware management settings, software patches, fixes, upgrades, commands, instructions, tests, diagnostics, a device "kill" command, a data wipe command or a combination thereof;

the configuration parameters are implemented automatically, by a user of the communications device, a person associated with a network, by the remote manager or a combination thereof; or the configuration parameters temporarily allow the remote manager to control the communications device.

24. A system comprising:

one or more communications devices, each communications device comprising a VoIP module, a cellular module and a diagnostic module communicably coupled to the VoIP module and the cellular module;

a remote manager communicably coupled to the communications devices via one or more networks;

the diagnostic module obtains data regarding the communications device, selects a communications protocol and either the VoIP module or the cellular module, creates a first message containing the data using the selected communications protocol, sends the first message to the remote manager via the selected module, receives a second message containing one or more configuration parameters from the remote manager via the selected module, and implements the configuration parameters;

the remote manager receives the first message containing data obtained from the communications device, analyzes the data from the first message, creates the configuration parameters, creates the second message containing the configuration parameters and sends the second message to the communications device; and wherein: (1) the data comprises diagnostic information, operational information, performance information, network information, status information, software information, firmware information, hardware information, user information, version information, virus information, data integrity information, data access information, security information, location information, authentication information or a combination thereof, (2) the communications protocol comprises SMS, GSM/GPRS, IP, MMS, WAP or http, (3) the steps are initiated periodically, whenever a problem is detected, by a user of the communications device, by the remote manager or a combination thereof, (4) the configuration parameters comprise device settings, network settings, SIP settings, cellular settings, WiFi settings, firmware management settings, software patches, fixes, upgrades, commands, instructions, tests, diagnostics, a device "kill" command, a data wipe command or a combination thereof, (5) the configuration parameters are implemented automatically, by a user of the communications device, a person associated with a network, by the remote manager or a combination thereof, or (6) the configuration parameters temporarily allow the remote manager to control the communications device.

25. The system as recited in claim 24, wherein the remote manager:

checks a status of one or more devices within a network;

performs one or more tests on the devices within the network;

changes one or more parameters of the devices within the network;

alerts an operator;

opens a report, logs the first message, logs the second message and closes the report;

decrypts the first message and encrypts the second message; or authenticates the user device.

26. The system as recited in claim 24, wherein the diagnostic module monitors a cellular connection, an IP connection, the communications device or a combination thereof, runs one or more diagnostics, records one or more results of the diagnostics, encrypts the first message, decrypts the second message, or authenticates the remote manager.

27. A method of using one or more VoIP-based applications and one or more cellular-based applications in a communications device having a VoIP module and a cellular module, comprising the steps of:

receiving an instruction from the VoIP-based applications or the cellular-based applications at a single application program interface communicably coupled to the VoIP-based applications, the cellular-based applications, the VoIP module and the cellular module;

processing the instruction into one or more VoIP-based commands and providing the VoIP-based commands to the VoIP module whenever the communications device is operating in a VoIP mode;

processing the instruction into one or more cellular-based commands and providing the cellular-based commands to the cellular module whenever the communications device is operating in a cellular mode;

receiving a command from the VoIP module or the cellular module at the single application program interface;

determining whether the command is to be provided to one of the VoIP-based applications or one of the cellular-based applications;

processing the command into one or more VoIP-based instructions and providing the VoIP-based instructions to the VoIP-based application whenever the command is to be provided to the VoIP-based application;

processing the command into one or more cellular-based instructions and providing the cellular-based instructions to the cellular-based application whenever the command is to be provided to the cellular-based application;

determining whether a network is accessible;

connecting to the network whenever the network is accessible;

entering a low power mode and remaining in the low power mode for a time period whenever the network is not accessible;

entering a higher power mode upon expiration of the time period and repeating the network determination step;

increasing the time period whenever the network is repeatedly not accessible;

determining whether any of the VoIP-based applications or the cellular-based applications are incompatible with the low power mode prior to entering the low power mode; and entering the low power mode only when no applications are incompatible with the low power mode.

28. A method of using one or more VoIP-based applications and one or more cellular-based applications in a communications device having a VoIP module and a cellular module, comprising the steps of:

receiving an instruction from the VoIP-based applications or the cellular-based applications at a single application program interface communicably coupled to the VoIP-based applications, the cellular-based applications, the VoIP module and the cellular module;

processing the instruction into one or more VoIP-based commands and providing the VoIP-based commands to the VoIP module whenever the communications device is operating in a VoIP mode;

processing the instruction into one or more cellular-based commands and providing the cellular-based commands to the cellular module whenever the communications device is operating in a cellular mode;

receiving a command from the VoIP module or the cellular module at the single application program interface;

determining whether the command is to be provided to one of the VoIP-based applications or one of the cellular-based applications;

processing the command into one or more VoIP-based instructions and providing the VoIP-based instructions to the VoIP-based application whenever the command is to be provided to the VoIP-based application;

processing the command into one or more cellular-based instructions and providing the cellular-based instructions to the cellular-based application whenever the command is to be provided to the cellular-based application;

receiving a message from a network while the communications device is operating in a low power mode;

determining whether the message requires a higher power mode;

responding to the message without changing the power mode whenever the message does not require the higher power mode; and changing to the higher power mode whenever the message requires the higher power mode.

29. The dual mode communications device as recited in claim 28, wherein:

a "keep alive" message or other message required to maintain a connection to the network is transmitted in the low power mode;

the message comprises a digital signal, an analog signal, a communications packet or a communications signal;

the message does not require the change whenever the message comprises a signaling message, a control message, an "are you there" message or other message related to a connection to the network; or the higher power mode comprises the sleep power mode or an active power mode.

30. A computer readable storage medium for using one or more VoIP-based applications and one or more cellular-based applications in a communications device having a VoIP module and a cellular module, the computer readable storage comprising program instructions when executed by a processor causes the processor to perform the steps of:

receiving an instruction from the VoIP-based applications or the cellular-based applications at a single application program interface communicably coupled to the VoIP-based applications, the cellular-based applications, the VoIP module and the cellular module;

processing the instruction into one or more VoIP-based commands and providing the VoIP-based commands to the VoIP module whenever the communications device is operating in a VoIP mode;

processing the instruction into one or more cellular-based commands and providing the cellular-based commands to the cellular module whenever the communications device is operating in a cellular mode;

receiving a command from the VoIP module or the cellular module at the single application program interface;

determining whether the command is to be provided to one of the VoIP-based applications or one of the cellular-based applications;

processing the command into one or more VoIP-based instructions and providing the VoIP-based instructions to the VoIP-based application whenever the command is to be provided to the VoIP-based application;

processing the command into one or more cellular-based instructions and providing the cellular-based instructions to the cellular-based application whenever the command is to be provided to the cellular-based application;

determining whether a network is accessible;

connecting to the network whenever the network is accessible;

entering a low power mode and remaining in the low power mode for a time period whenever the network is not accessible;

entering a higher power mode upon expiration of the time period and repeating the network determination step;

increasing the time period whenever the network is repeatedly not accessible;

determining whether any of the VoIP-based applications or the cellular-based applications are incompatible with the low power mode prior to entering the low power mode; and entering the low power mode only when no applications are incompatible with the low power mode.

31. A computer readable storage medium for using one or more VoIP-based applications and one or more cellular-based applications in a communications device having a VoIP module and a cellular module, the computer readable storage comprising program instructions when executed by a processor causes the processor to perform the steps of:

receiving an instruction from the VoIP-based applications or the cellular-based applications at a single application program interface communicably coupled to the VoIP-based applications, the cellular-based applications, the VoIP module and the cellular module;

processing the instruction into one or more VoIP-based commands and providing the VoIP-based commands to the VoIP module whenever the communications device is operating in a VoIP mode;

processing the instruction into one or more cellular-based commands and providing the cellular-based commands to the cellular module whenever the communications device is operating in a cellular mode;

receiving a command from the VoIP module or the cellular module at the single application program interface;

determining whether the command is to be provided to one of the VoIP-based applications or one of the cellular-based applications;

processing the command into one or more VoIP-based instructions and providing the VoIP-based instructions to the VoIP-based application whenever the command is to be provided to the VoIP-based application;

processing the command into one or more cellular-based instructions and providing the cellular-based instructions to the cellular-based application whenever the command is to be provided to the cellular-based application;

receiving a message from a network while the communications device is operating in a low power mode;

determining whether the message requires a higher power mode;

responding to the message without changing the power mode whenever the message does not require the higher power mode; and changing to the higher power mode whenever the message requires the higher power mode.

32. The computer readable storage medium as recited in claim 31, wherein:
- a "keep alive" message or other message required to maintain a connection to the network is transmitted in the low power mode;
- the message comprises a digital signal, an analog signal, a communications packet or a communications signal;
- the message does not require the change whenever the message comprises a signaling message, a control message, an "are you there" message or other message related to a connection to the network; or
- the higher power mode comprises the sleep power mode or an active power mode.

33. A dual mode communications device comprising:
one or more VoIP-based applications;
a VoIP module;
one or more cellular-based applications;
a cellular module;
a single application program interface communicably coupled to the VoIP-based applications, the VoIP module, the cellular-based applications and the cellular module wherein the single application program interface receives an instruction from the VoIP-based applications or the cellular-based applications, processes the instruction into one or more VoIP-based commands and provides the VoIP-based commands to the VoIP module whenever the communications device is operating in a VoIP mode, processes the instruction into one or more cellular-based commands and provides the cellular-based commands to the cellular module whenever the communications device is operating in a cellular mode, receives a command from the VoIP module or the cellular module, determines whether the command is to be provided to one of the VoIP-based applications or one of the cellular-based applications, processes the command into one or more VoIP-based instructions and provides the VoIP-based instructions to the VoIP-based application whenever the command is to be provided to the VoIP-based application, and processes the command into one or more cellular-based instructions and provides the cellular-based instructions to the cellular-based application whenever the command is to be provided to the cellular-based application; and
a power management module that determines whether a network is accessible, connects to the network whenever the network is accessible, enters a low power mode and remains in the low power mode for a time period whenever the network is not accessible, enters a higher power mode upon expiration of the time period and repeating the network determination step, and increases the time period whenever the network is repeatedly not accessible.

34. The dual mode communications device as recited in claim 33, wherein:
- the time period is increased in accordance with a pattern, a preset increment, a dynamic increment or a combination thereof;
- the time period is reset whenever the network is accessible;
- the time period has a minimum value and a maximum value;
- the time period is greater than or equal to ten seconds and less than or equal to ten minutes;
- the low power mode comprises a deep sleep power mode or a sleep power mode;
- the higher power mode comprises the sleep power mode or an active power mode;
- the power mode is adjusted based on a communications received from the network; or
- the network comprises a cellular network, an unlicensed mobile access network or both.

35. The dual mode communications device as recited in claim 33, wherein the power management module determines whether any of the VoIP-based applications or the cellular-based applications are incompatible with the low power mode prior to entering the low power mode, and enters the low power mode only when no applications are incompatible with the low power mode.

36. A dual mode communications device comprising:
one or more VoIP-based applications;
a VoIP module;
one or more cellular-based applications;
a cellular module;
a single application program interface communicably coupled to the VoIP-based applications, the VoIP module, the cellular-based applications and the cellular module wherein the single application program interface receives an instruction from the VoIP-based applications or the cellular-based applications, processes the instruction into one or more VoIP-based commands and provides the VoIP-based commands to the VoIP module whenever the communications device is operating in a VoIP mode, processes the instruction into one or more cellular-based commands and provides the cellular-based commands to the cellular module whenever the communications device is operating in a cellular mode, receives a command from the VoIP module or the cellular module, determines whether the command is to be provided to one of the VoIP-based applications or one of the cellular-based applications, processes the command into one or more VoIP-based instructions and provides the VoIP-based instructions to the VoIP-based application whenever the command is to be provided to the VoIP-based application, and processes the command into one or more cellular-based instructions and provides the cellular-based instructions to the cellular-based application whenever the command is to be provided to the cellular-based application; and
a power management module that whenever a message is received from a network while the communications device is operating in a low power mode, determines whether the message requires a higher power mode, responds to the message without changing the power mode whenever the message does not require the higher power mode, and changes to the higher power mode whenever the message requires the higher power mode.

37. The dual mode communications device as recited in claim 36, wherein:
- a "keep alive" message or other message required to maintain a connection to the network is transmitted in the low power mode;
- the message comprises a digital signal, an analog signal, a communications packet or a communications signal;
- the message does not require the change whenever the message comprises a signaling message, a control message, an "are you there" message or other message related to a connection to the network; or the higher power mode comprises the sleep power mode or an active power mode.

38. A dual mode communications device comprising:

one or more VoIP-based applications;

a VoIP module;

one or more cellular-based applications;

a cellular module;

a single application program interface communicably coupled to the VoIP-based applications, the VoIP module, the cellular-based applications and the cellular module wherein the single application program interface receives an instruction from the VoIP-based applications or the cellular-based applications, processes the instruction into one or more VoIP-based commands and provides the VoIP-based commands to the VoIP module whenever the communications device is operating in a VoIP mode, processes the instruction into one or more cellular-based commands and provides the cellular-based commands to the cellular module whenever the communications device is operating in a cellular mode, receives a command from the VoIP module or the cellular module, determines whether the command is to be provided to one of the VoIP-based applications or one of the cellular-based applications, processes the command into one or more VoIP-based instructions and provides the VoIP-based instructions to the VoIP-based application whenever the command is to be provided to the VoIP-based application, and processes the command into one or more cellular-based instructions and provides the cellular-based instructions to the cellular-based application whenever the command is to be provided to the cellular-based application;

a diagnostic module that obtains data regarding the communications device, selects a communications protocol and either the VoIP module or the cellular module, creates a first message containing the data using the selected communications protocol, sends the first message to a remote manager via the selected module, receives a second message containing one or more configuration parameters from the remote manager via the selected module, and implements the configuration parameters; and wherein: (1) the data comprises diagnostic information, operational information, performance information, network information, status information, software information, firmware information, hardware information, user information, version information, virus information, data integrity information, data access information, security information, location information, authentication information or a combination thereof, (2) the communications protocol comprises SMS, GSM/GPRS, IP, MMS, WAP or http, (3) the steps are initiated periodically, whenever a problem is detected, by a user of the communications device, by the remote manager or a combination thereof, (4) the configuration parameters comprise device settings, network settings, SIP settings, cellular settings, WiFi settings, firmware management settings, software patches, fixes, upgrades, commands, instructions, tests, diagnostics, a device "kill" command, a data wipe command or a combination thereof, (5) the configuration parameters are implemented automatically, by a user of the communications device, a person associated with a network, by the remote manager or a combination thereof, or (6) the configuration parameters temporarily allow the remote manager to control the communications device.

39. The dual mode communications device as recited in claim 38, wherein the diagnostic module monitors a cellular connection, an IP connection, the communications device or a combination thereof, runs one or more diagnostics, records one or more results of the diagnostics, encrypts the first message, decrypts the second message, or authenticates the remote manager.

* * * * *